US010103509B2

(12) United States Patent
Kakizaki et al.

(10) Patent No.: US 10,103,509 B2
(45) Date of Patent: Oct. 16, 2018

(54) EXCIMER LASER DEVICE

(71) Applicant: Gigaphoton, Inc., Tochigi (JP)

(72) Inventors: Kouji Kakizaki, Oyama (JP); Akira Suwa, Oyama (JP); Osamu Wakabayashi, Oyama (JP); Hiroshi Umeda, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/836,878

(22) Filed: Dec. 10, 2017

(65) Prior Publication Data

US 2018/0102622 A1    Apr. 12, 2018

Related U.S. Application Data

(63) Continuation of application No. PCT/JP2015/070133, filed on Jul. 14, 2015.

(51) Int. Cl.
*H01S 3/13* (2006.01)
*H01S 3/23* (2006.01)
*H01S 3/097* (2006.01)
*H01S 3/225* (2006.01)
(Continued)

(52) U.S. Cl.
CPC ........ *H01S 3/2308* (2013.01); *H01S 3/09702* (2013.01); *H01S 3/10007* (2013.01); *H01S 3/10015* (2013.01); *H01S 3/10038* (2013.01); *H01S 3/10069* (2013.01);
(Continued)

(58) Field of Classification Search
CPC ............. H01S 3/09702; H01S 3/10069; H01S 3/1305; H01S 3/225; H01S 3/2308; H01S 3/10007; H01S 3/10015; H01S 3/10038; H01S 3/2222; H01S 3/2316
See application file for complete search history.

(56) References Cited

U.S. PATENT DOCUMENTS 5,881,079 A    3/1999   Doerr et al.
7,061,959 B2   6/2006   Partlo et al.
(Continued)

FOREIGN PATENT DOCUMENTS

JP    H04-252013 A    9/1992
JP    2000-058955 A   2/2000
(Continued)

OTHER PUBLICATIONS

International Search Report issued in PCT/JP2015/070133; dated Oct. 6, 2015.
(Continued)

*Primary Examiner* — Kinam Park
(74) *Attorney, Agent, or Firm* — Studebaker & Brackett PC

(57) ABSTRACT

The excimer laser device receives data on a target value of pulse energy from an external device and outputs a pulse laser beam. The excimer laser device includes a master oscillator, at least one power amplifier including a chamber provided in an optical path of the pulse laser beam outputted from the master oscillator, a pair of electrodes provided in the chamber, and an electric power source configured to apply voltage to the pair of electrodes, and a controller configured to control the electric power source of one power amplifier of the at least one power amplifier to stop applying the voltage to the pair of electrodes based on the target value of the pulse energy.

12 Claims, 27 Drawing Sheets

(51) Int. Cl.
*H01S 3/10* (2006.01)
*H01S 3/22* (2006.01)

(52) U.S. Cl.
CPC ............ *H01S 3/225* (2013.01); *H01S 3/2316* (2013.01); *H01S 3/2222* (2013.01)

(56) References Cited

U.S. PATENT DOCUMENTS

| | | | |
|---|---|---|---|
| 2005/0135451 A1* | 6/2005 | Rule | H01S 3/134 372/55 |
| 2008/0030877 A1 | 2/2008 | Turk et al. | |
| 2008/0205472 A1* | 8/2008 | Dunstan | G03F 7/70025 372/59 |
| 2010/0177797 A1* | 7/2010 | Appleyard | H01S 3/094003 372/38.03 |
| 2012/0236885 A1* | 9/2012 | Watanabe | H01S 3/03 372/31 |
| 2012/0267348 A1 | 10/2012 | Turk et al. | |
| 2016/0336713 A1* | 11/2016 | Nogiwa | H01S 3/2316 |
| 2017/0070024 A1* | 3/2017 | Kawasuji | H01L 21/027 |
| 2017/0279240 A1* | 9/2017 | O'Brien | H01S 3/036 |

FOREIGN PATENT DOCUMENTS

| | | |
|---|---|---|
| JP | 2000-269570 A | 9/2000 |
| JP | 2007-059788 A | 3/2007 |
| JP | 2010-533373 | 10/2010 |
| WO | 2007/127356 A2 | 11/2007 |
| WO | 2011/102486 A1 | 8/2011 |

OTHER PUBLICATIONS

International Preliminary Report on Patentability issued in PCT/JP2015/070133; dated Jan. 16, 2018.

* cited by examiner

| SETTING VALUE V OF CHARGING VOLTAGE | V1 | V2 | V3 | ... | VN |
|---|---|---|---|---|---|
| OUTPUT PULSE ENERGY $P_{MOPA}$ WHERE MO AND PA ARE SYNCHRONOUSLY OPERATED | $P1_{MOPA}$ | $P2_{MOPA}$ | $P3_{MOPA}$ | ... | $PN_{MOPA}$ |
| OUTPUT PULSE ENERGY $P_{MO}$ WHERE MO IS OPERATED ALONE | $P1_{MO}$ | $P2_{MO}$ | $P3_{MO}$ | ... | $PN_{MO}$ |

EXCIMER LASER DEVICE

TECHNICAL FIELD

The present disclosure relates to an excimer laser device.

BACKGROUND ART

A laser annealing apparatus may apply a pulsed laser beam on an amorphous silicon film formed on a substrate. The pulsed laser beam may be emitted from a laser system such as an excimer laser system. The pulsed laser beam may have a wavelength of ultraviolet light region. Such pulsed laser beam may reform the amorphous silicon film to a poly-silicon film. The poly-silicon film can be used to form thin film transistors (TFTs). The TFTs may be used in large-sized liquid crystal displays.

Patent Document 1: US Patent Application Publication No. 2008/0030877 A

Patent Document 2: US Patent Application Publication No. 2012/0267348 A

Patent Document 3: Japanese Patent Application Publication No. 2000-269570 A

Patent Document 4: U.S. Pat. No. 5,881,079 B

Patent Document 5: International Publication No. 2007/127356 A

Patent Document 6: U.S. Pat. No. 7,061,959 B

SUMMARY

An excimer laser device according to an aspect of the present disclosure may be configured to receive data on a target value of pulse energy from an external device and output a pulse laser beam. The excimer laser device may include a master oscillator, at least one power amplifier including a chamber provided in an optical path of the pulse laser beam outputted from the master oscillator, a pair of electrodes provided in the chamber, and an electric power source configured to apply voltage to the pair of electrodes, and a controller configured to control the electric power source of one power amplifier of the at least one power amplifier to stop applying the voltage to the pair of electrodes based on the target value of the pulse energy.

An excimer laser device according to another aspect of the present disclosure may be configured to receive data on a target value of pulse energy from an external device and output a pulse laser beam. The excimer laser device may include a master oscillator, at least one power amplifier including a chamber provided in an optical path of the pulse laser beam outputted from the master oscillator, a pair of electrodes provided in the chamber, and an electric power source configured to apply voltage to the pair of electrodes, and a controller configured to control the electric power source of one power amplifier of the at least one power amplifier to stop applying the voltage to the pair of electrodes at a time when the pulse laser beam passes between the pair of electrodes based on the target value of the pulse energy.

BRIEF DESCRIPTION OF DRAWINGS

Exemplary embodiments of the present disclosure will be described below as mere examples with reference to the appended drawings.

FIG. 16 is a flowchart showing details of a process shown in FIG. 12 to calculate approximate equations and the like.

FIG. 23 is a flowchart showing details of a process shown in FIG. 19 to calculate approximate equations and the like.

DESCRIPTION OF EMBODIMENTS

Figure 1:
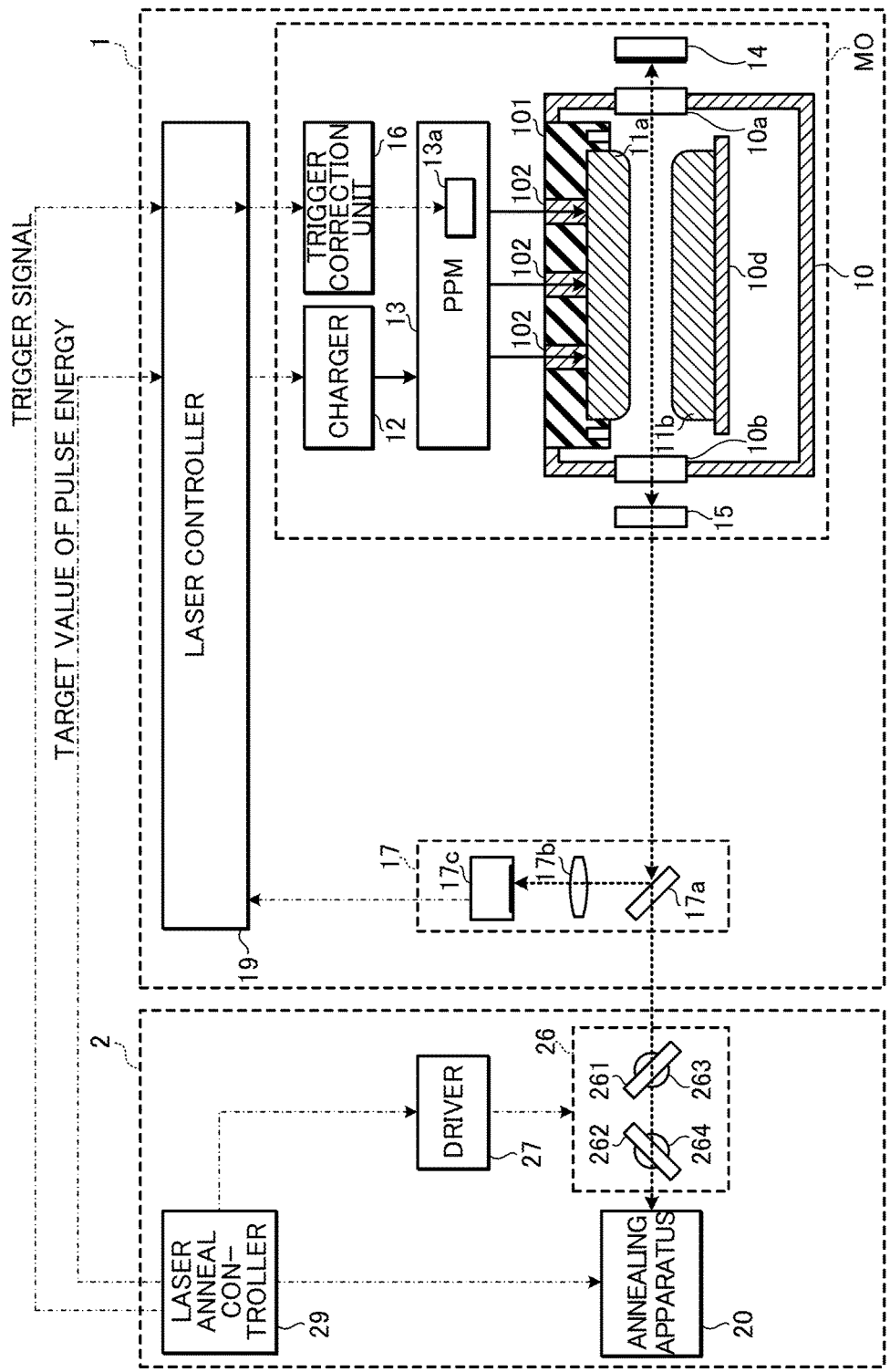
FIG. 1 schematically shows a configuration of a laser annealing system including an excimer laser device according to a comparative example.

Contents
1. Outline
2. Laser Annealing System According to Comparative Example
   2.1 Laser Annealing Apparatus
   2.2 Master Oscillator
   2.2.1 Laser Chamber
   2.2.2 Optical Resonator
   2.3 Pulse Energy Measuring Unit
   2.4 Laser Controller
   2.5 Problems
3. Laser Annealing System Where Power Amplifier is Controlled to Stop (First Embodiment)
   3.1 Configuration
   3.2 Control of Pulse Energy
   3.2.1 Main Flow
   3.2.2 Details of Reading Data
   3.2.3 Details of Operation Setting
   3.2.4 First Modified Example of Operation Setting
   3.2.5 Second Modified Example of Operation Setting
   13.2.6 Third Modified Example of Operation Setting
4. Laser Annealing System That Performs Adjusting Oscillation (Second Embodiment)
   4.1 Configuration
   4.2 Control of Pulse Energy
   4.2.1 Main Flow
   4.2.2 Details of Measuring Process
   4.2.3 Details of Calculating Approximate Equations
5. Laser Annealing System Including a Plurality of Power Amplifiers (Third Embodiment)
   5.1 Configuration
   5.2 Control of Pulse Energy
   5.2.1 Main Flow
   5.2.2 Details of Measuring Process
   5.2.3 Details of Calculating Approximate Equations
   5.2.4 Details of Calculating the Number of Power Amplifiers to be Operated
   5.2.5 Details of Operation Setting
6. Others
   6.1 Annealing Apparatus
   6.2 Configuration of Controller Embodiments of the present disclosure will be described in detail below with reference to the drawings. The embodiments described below indicate several examples of the present disclosure, and may not intend to limit the content of the present disclosure. Not all of the configurations and operations described in the embodiments are indispensable in the present disclosure. Identical reference symbols may be assigned to identical constituent elements and redundant descriptions thereof may be omitted.

1. Outline

Pulse energy of a pulse laser beam outputted from an excimer laser device for a laser annealing apparatus is demanded to be controlled in a wide dynamic range. Control of the pulse energy may be performed by operation of an attenuator provided in an optical path of the pulse laser beam.

However, the operation of the attenuator may take too much time to change the pulse energy by a large amount for each pulse. Further, since the attenuator controls the pulse energy by changing transmittances of partial reflection mirrors of the attenuator, a part of the pulse laser beam may be wasted.

In an aspect of the present disclosure, the laser controller of the excimer laser device may control at least one power amplifier to stop applying voltage to a pair of electrodes based on a target value of pulse energy. For example, the laser controller may stop outputting a trigger signal triggering the voltage to the pair of electrodes for at least one power amplifier. Alternatively, for example, the laser controller may set a charging voltage to a value where an electric discharge does not occur between the pair of electrodes for at least one power amplifier.

2. Laser Annealing System According to Comparative Example

FIG. 1 schematically shows a configuration of a laser annealing system including an excimer laser device according to a comparative example. The laser annealing system shown in FIG. 1 may include an excimer laser device 1 and a laser annealing apparatus 2. The excimer laser device 1 may include a master oscillator MO, a pulse energy measuring unit 17, and a laser controller 19.

2.1 Laser Annealing Apparatus

The laser annealing apparatus 2 may include an annealing apparatus 20, an attenuator 26, and a laser anneal controller 29. The annealing apparatus 20, which is controlled by the laser anneal controller 29, may perform laser annealing using a pulse laser beam outputted from the master oscillator MO.

The attenuator 26 may be provided in an optical path of the pulse laser beam between the master oscillator MO and the annealing apparatus 20. The attenuator 26 may include two partial reflection mirrors 261 and 262, and rotary stages 263 and 264 for the respective partial reflection mirrors 261 and 262. The two partial reflection mirrors 261 and 262 are each an optical element that changes its transmittance depending on an incident angle of the pulse laser beam.

Postures of the two partial reflection mirrors 261 and 262 included in the attenuator 26 may be controlled such that the incident angles of the pulse laser beam incident on the partial reflection mirrors 261 and 262 are substantially equal to each other and the transmittances of the partial reflection mirrors 261 and 262 for the pulse laser beam are desired transmittances. The laser anneal controller 29 may control a driver 27 to drive the rotary stages 263 and 264. Thus, the pulse laser beam outputted from the excimer laser device 1 may pass through the attenuator 26 with a desired pulse energy reduced by the attenuator 26.

2.2 Master Oscillator

The master oscillator MO may include a laser chamber 10, a pair of electrodes 11a and 11b, a charger 12, a pulse power module (PPM) 13, and a trigger correction unit 16. The master oscillator MO may further include a high reflective mirror 14 and an output coupling mirror 15. FIG. 1 shows an internal configuration of the laser chamber 10 as viewed in a direction perpendicular to both a traveling direction of the pulse laser beam and a direction of an electric discharge between the pair of electrodes 11a and 11b.

2.2.1 Laser Chamber

The laser chamber 10 may seal laser gas as a laser medium including, for example, a rare gas such as argon, krypton, or xenon, a buffer gas such as neon or helium, and a halogen gas such as chlorine or fluorine, and the like. The pair of electrodes 11a and 11b for exciting the laser medium by the electric discharge may be provided in the laser chamber 18. The laser chamber 10 may have an opening sealed by an insulating member 181. The electrode 11a may be supported by the insulating member 101, and the electrode 11b may be supported by a return plate 10d. The return plate 10d may be connected to an inner surface of the laser chamber 10 through unillustrated wiring. In the insulating member 101, conductive members 102 may be molded. The conductive members 102 may apply a high voltage supplied by the pulse power module 13 to the electrode 11a.

The charger 12 may be a direct-current power source to charge an unillustrated charging capacitor in the pulse power module 13 with a predetermined voltage. The pulse power module 13 may include a switch 13a. When the switch 13a turns ON, the pulse power module 13 may generate a pulsed high voltage using electric energy held by the above-described charging capacitor. The pulsed high voltage may be applied between the pair of electrodes 11a and 11b.

The high voltage applied between the pair of electrodes 11a and 11b may cause the electric discharge due to a dielectric breakdown between the pair of electrodes 11a and 11b. The energy of the electric discharge may excite the laser medium in the laser chamber 10 to cause the laser medium to shift to a high energy level. The excited laser medium may then shift back to a low energy level to generate light depending on the difference between the energy levels.

Respective ends of the laser chamber 10 may have windows 10a and 10b. The light generated in the laser chamber 10 may be emitted from the laser chamber 10 through the windows 10a and 10b.

2.2.2 Optical Resonator

The high reflective mirror :14 may reflect the light emitted through the window 10a of the laser chamber 10 at high reflectance to return the light to the laser chamber 10.

The output coupling mirror 15 may transmit and output a part of the light emitted through the window 10b of the laser chamber 10, and may reflect and return another part of the light to the laser chamber 10.

The high reflective mirror 14 and the output coupling mirror 15 may thus constitute an optical resonator. The light emitted from the laser chamber 10 may travel back and forth between the high reflective mirror 14 and the output coupling mirror 15, and may be amplified each time it passes through a laser gain space between the electrodes 11a and 11b. A part of the light thus amplified may be outputted through the output coupling mirror 15 as the pulse laser beam.

2.3 Pulse Energy Measuring Unit

The pulse energy measuring unit 17 may be provided in an optical path of the pulse laser beam outputted from the master oscillator MO. The pulse energy measuring unit 17 may include a beam splitter 17a, focusing optics 17b, and an optical sensor 17c.

The beam splitter 17a may transmit a part of the pulse laser beam at high transmittance, and reflect another part of the pulse laser beam to the focusing optics 17b. The focusing optics 17b may focus the pulse laser beam reflected by the beam splitter 17a on a light-receiving surface of the optical sensor 17c. The optical sensor 17c may detect pulse energy of the pulse laser beam focused on the light-receiving surface, and output data on the detected pulse energy to the laser controller 19.

2.4 Laser Controller

The laser controller 19 may send and receive various signals to and from the laser anneal controller 29 of the laser annealing apparatus 2. For example, the laser controller 19 may receive a trigger signal, data on a target value of pulse energy, and the like, from the laser anneal controller 29. Further, the laser controller 19 may receive the data on the detected pulse energy from the pulse energy measuring unit 17.

The laser controller 19 may control a setting value of a charging voltage of the charger 12 based on the data on the target value of the pulse energy received from the laser anneal controller 29 and the data on the detected pulse energy received from the pulse energy measuring unit 17. Control of the pulse energy of the pulse laser beam may be achieved by controlling the charging voltage of the charger 12.

The laser controller 19 may send the trigger signal received from the laser anneal controller 29 to the trigger correction unit 16. The trigger correction unit 15 may generate a switching signal by delaying the trigger signal received from the laser controller 19 by a predetermined delay time, and output the switching signal to the switch 13a of the pulse power module 13. The switching signal may cause the switch 13a to turn ON. The laser controller 19 may set the predetermined delay time to the trigger correction unit 16 to perform timing control of the electric discharge between the pair of electrodes 11a and 11b.

2.5 Problems

In the laser annealing system shown in FIG. 1, control of the pulse energy of the pulse laser beam is performed by the attenuator 26. However, operation of the attenuator 26 may take too much time to change the pulse energy by a large amount for each pulse.

Further, since the attenuator 26 controls the pulse energy by changing transmittances of the partial reflection mirrors, a part of the pulse laser beam may be wasted.

To solve the problems, the embodiments explained below may include at least one power amplifier provided in the optical path of the pulse laser beam outputted from the master oscillator MO. The at least one power amplifier may stop amplifying operation when a target value of the pulse energy is equal to or lower than a predetermined value. This may achieve control of the pulse energy in a wide dynamic range and at high frequency.

3. Laser Annealing System Where Power Amplifier is Controlled to Stop (First Embodiment)

3.1 Configuration

Figure 2:
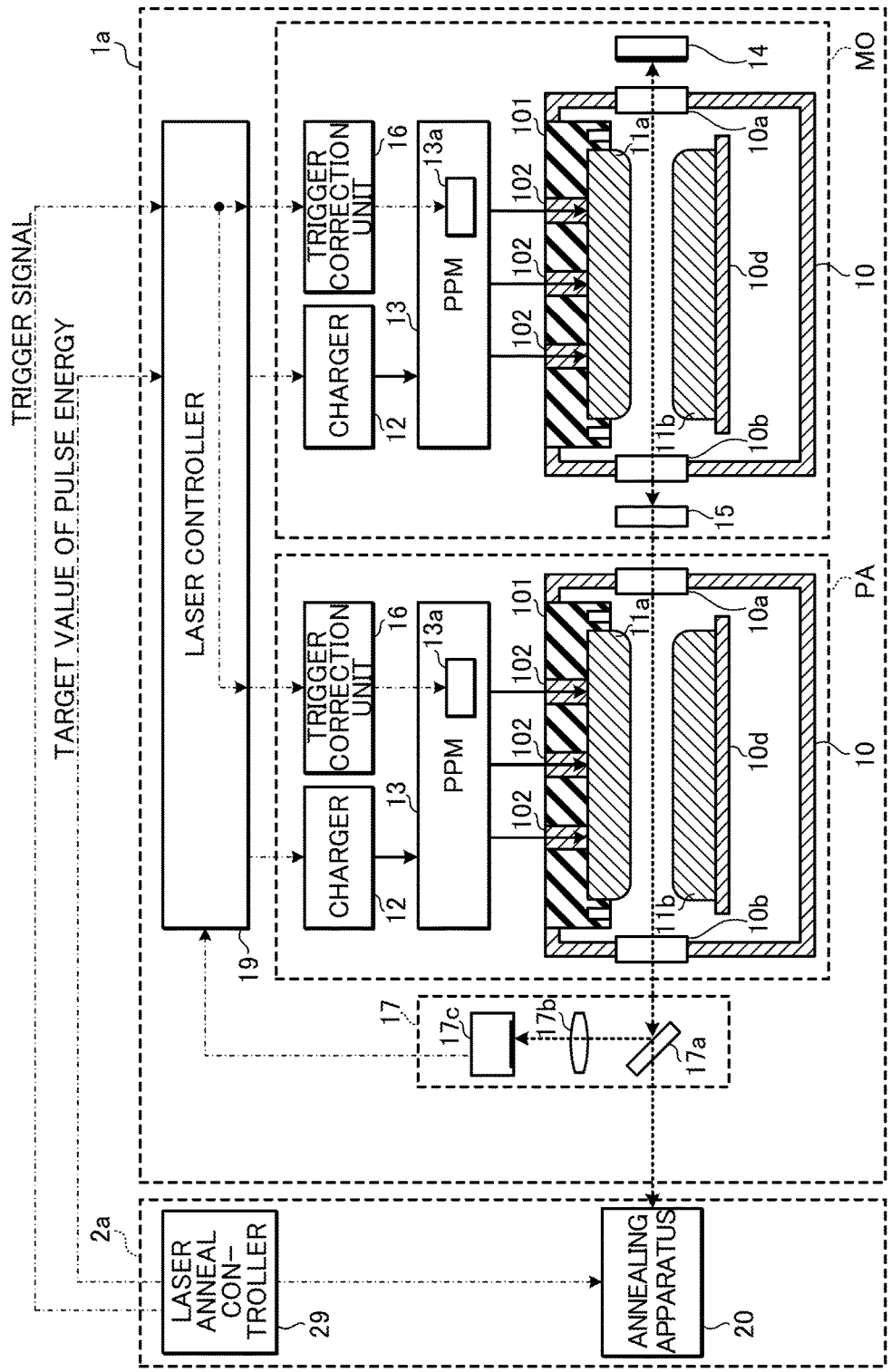
FIG. 2 schematically shows a configuration of a laser annealing system including an excimer laser device according to a first embodiment of the present disclosure.

FIG. 2 schematically shows a configuration of a laser annealing system including an excimer laser device according to a first embodiment of the present disclosure. The excimer laser device 1a of the laser annealing system in the first embodiment may include a power amplifier PA in addition to the excimer laser device 1 explained with reference to FIG. 1. Further, the laser annealing apparatus 2a of the laser annealing system in the first embodiment may not necessarily include the attenuator 26 and the driver 27 in the laser annealing apparatus 2 explained with reference to FIG. 1.

Configuration of the power amplifier PA may be different from that of the master oscillator MO at the point where the power amplifier PA may not necessarily include an optical resonator. Namely, the power amplifier PA may not necessarily include the high reflective mirror 14 or the output coupling mirror 15. A laser chamber 10 of the power amplifier PA may be provided in the optical path of the pulse laser beam outputted from the master oscillator MO. The other configuration of the power amplifier PA may be substantially the same as that of the master oscillator MO.

The trigger correction unit 16 of the power amplifier PA may be controlled such that the electric discharge occurs between the pair of electrodes 11a and 11b of the power amplifier PA at the time when the pulse laser beam outputted from the master oscillator MO passes between the pair of electrodes 11a and 11b of the power amplifier PA. The energy of the electric discharge may excite the laser medium in the laser chamber 10 of the power amplifier PA. The pulse laser beam outputted from the master oscillator MO may be amplified in the laser medium thus excited. The amplified pulse laser beam may be outputted to the pulse energy measuring unit 17 and the annealing apparatus 20.

In the first embodiment, when the laser controller 19 controls the pulse energy to a value equal to or lower than a predetermined threshold value, the laser controller 19 may stop operation of the power amplifier PA. For example, applying voltage to the pair of electrodes 11a and 11b of the power amplifier PA may be stopped such that the electric discharge does not occur in the laser chamber 10 of the power amplifier PA. Accordingly, the laser medium in the power amplifier PA may not necessarily be excited. The pulse laser beam entered the power amplifier PA where the laser medium is not excited may pass through the power amplifier PA without being amplified and be outputted from the excimer laser device 1a. Whether the electric discharge occurs between the pair of electrodes 11a and 11b of the power amplifier PA may be controlled for each pulse of the pulse laser beam. The first embodiment may thus control the pulse energy at high frequency.

3.2 Control of Pulse Energy
3.2.1 Main Flow

Figure 3:
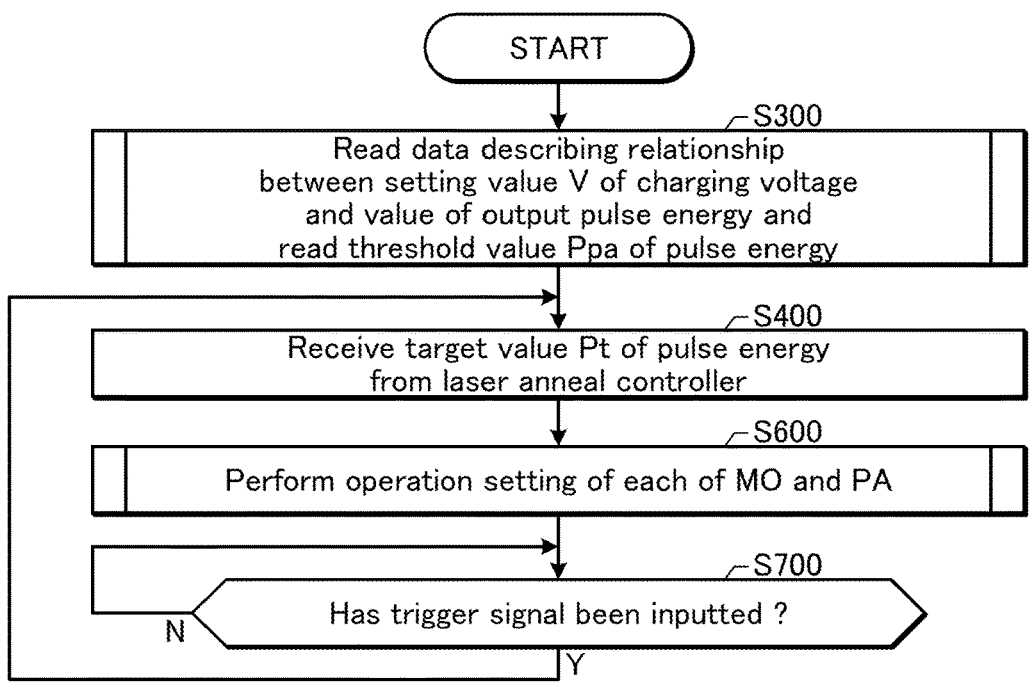
FIG. 3 is a flowchart showing a process performed by a laser controller shown in FIG. 2.

FIG. 3 is a flowchart showing a process performed by the laser controller shown in FIG. 2. The laser controller 19 in the first embodiment may control the pulse energy of the pulse laser beam outputted from the excimer laser device 1a by controlling the electric discharge in the power amplifier PA in the process described below.

First, at S300, the laser controller 19 may read data, describing relationship between a setting value V of the charging voltage and a value of the pulse energy of the pulse laser beam outputted from the excimer laser device 1a, from a storage device. A simple explanation is made here for a situation where the setting value V is a common value for the charging voltage in the master oscillator MO and the charging voltage in the power amplifier PA. However, separate values may be set in the master oscillator MO and the power amplifier PA.

The laser controller 19 may further read a threshold value Ppa of the pulse energy from the storage device.

The storage device is described later with reference to FIG. 29.

Details of the process of S300 are described later with reference to FIG. 4.

Next, at S400, the laser controller 19 may receive a target value Pt of the pulse energy from the laser anneal controller 29. The target value Pt of the pulse energy may be set according to characteristic of the laser anneal such as desired annealing depth or desired crystal grain size.

Next, at S600, the laser controller 19 may perform operation setting of each of the master oscillator MO and the power amplifier PA. If the target value Pt of the pulse energy is lower than the threshold value Ppa of the pulse energy, for example, the laser controller 19 may stop operation of the power amplifier PA and operate the master oscillator MO alone. If the target value Pt of the pulse energy is equal to or higher than the threshold value Ppa of the pulse energy, the laser controller 19 may operate the power amplifier PA synchronously with the master oscillator MO to cause the pulse laser beam to be amplified and outputted. The pulse energy of the pulse laser beam outputted from the excimer laser device 1a may thus be controlled.

Details of the process of S600 are described later with reference to FIG. 7.

Next, at S700, the laser controller 15 may determine whether a trigger signal has been inputted from the laser anneal controller 29. If the trigger signal has not been inputted (S700: NO), the laser controller 19 may wait until the trigger signal is inputted. If the trigger signal has been inputted (S700: YES), a pulse laser beam may be outputted from the excimer laser device 1a. In that case, the laser controller 19 may return to S400 described above to repeat the process of S400 and the succeeding process to control the pulse energy of the next pulse according to a new target value Pt of the pulse energy.

3.2.2 Details of Reading Data

Figure 4:
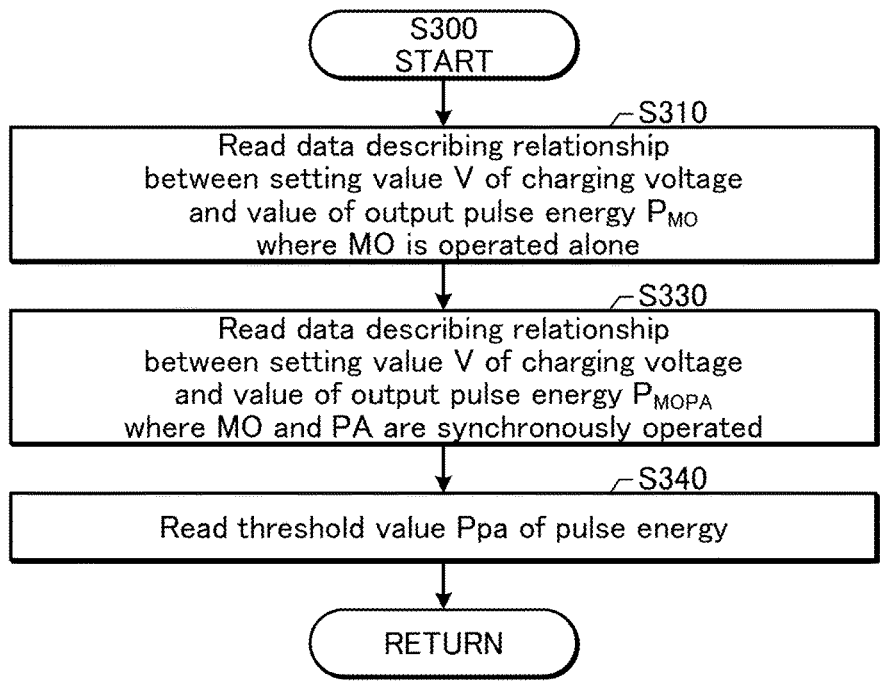
FIG. 4 is a flowchart showing details of a process shown in FIG. 3 to read data.

FIG. 4 is a flowchart showing details of the process shown in FIG. 3 to read data. The process shown in FIG. 4 may be performed by the laser controller 19 as a subroutine of S300 shown in FIG. 3.

First, at S310, the laser controller 19 may read data, describing relationship between the setting value V of the charging voltage and a value of output pulse energy $P_{MO}$ in a case where the master oscillator MO is operated alone, from the storage device.

Next, at S330, the laser controller 19 may read data, describing the relationship between the setting value V of the charging voltage and a value of output pulse energy $P_{MOPA}$ in a case where the master oscillator MO and the power amplifier PA are synchronously operated, from the storage device.

Next, at S340, the laser controller 19 may read the threshold value Ppa of the pulse energy from the storage device.

Figures 5, 6:
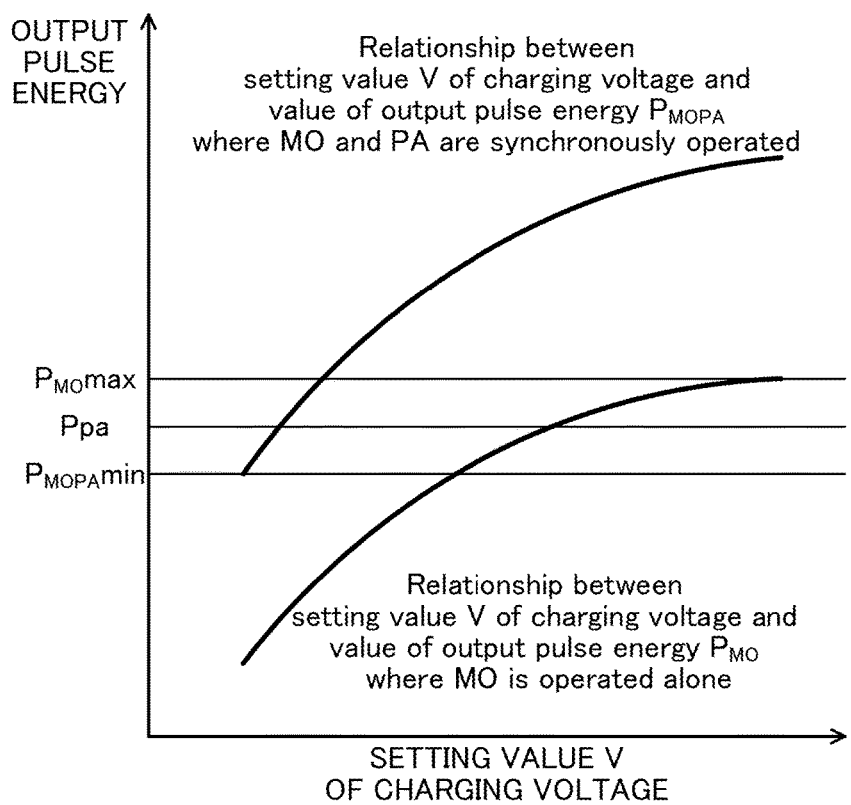
FIG. 5 shows an example of the data describing a relationship between a setting value V of charging voltage and a value of pulse energy.
FIG. 6 shows an example of a threshold value Ppa of pulse energy and the relationship between the setting value V of the charging voltage and the value of the pulse energy.

FIG. 5 shows an example of the data describing the relationship between the setting value V of the charging voltage and the value of the output pulse energy. The data describing the relationship between the setting value V of the charging voltage and the value of the output pulse energy may be stored in the storage device in a table format.

As shown in FIG. 5, values V1 to VN may each be possible to be set as the setting value V of the charging voltage. Values of the pulse energy of the pulse laser beam outputted from the excimer laser device 1a may be measured in advance for the respective setting values V and stored in the storage device.

For example, values of the pulse energy $P1_{MOPA}$, $P2_{MOPA}$, ..., $PN_{MOPA}$ of the pulse laser beam outputted in the case where the master oscillator MO and the power amplifier PA are synchronously operated may be stored for the respective setting values V1, V2, ..., VN.

Further, for example, values of the pulse energy $P1_{MO}$, $P2_{MO}$, ..., $PN_{MO}$ of the pulse laser beam outputted in the case where the master oscillator MO is operated alone may be stored for the respective setting values V1, V2, ..., VN.

FIG. 6 shows an example of a threshold value Ppa of the pulse energy and the relationship between the setting value V of the charging voltage and the value of the output pulse energy. As shown in FIG. 6, in the case where the master oscillator MO is operated alone, the higher the setting value V of the charging voltage is, the higher the pulse energy $P_{MO}$ is. Further, in the case where the master oscillator MO and the power amplifier PA are synchronously operated, the higher the setting value V of the charging voltage is, the higher the pulse energy $P_{MOPA}$ is.

The pulse energy $P_{MOPA}$ may be higher than the pulse energy $P_{MO}$ at the same setting value V of the charging voltage.

Accordingly, if the target value Pt of the pulse energy is low, the master oscillator MO may be operated alone. Controlling the setting value V of the charging voltage may allow the pulse energy of the pulse laser beam outputted from the excimer laser device 1a to approach the target value Pt of the pulse energy.

If the target value Pt of the pulse energy is high, the master oscillator MO and the power amplifier PA may be synchronously operated. Controlling the setting value V of the charging voltage may allow the pulse energy of the pulse laser beam outputted from the excimer laser device 1a to approach the target value Pt of the pulse energy.

The maximum value $P_{MO}$max of the pulse energy $P_{MO}$ in the case where the master oscillator MO is operated alone may preferably be higher than the minimum value $P_{MOPA}$min of the pulse energy $P_{MOPA}$ in the case where the master oscillator MO and the power amplifier PA are synchronously operated. The dynamic range of the pulse energy $P_{MO}$ and the dynamic range of the pulse energy $P_{MOPA}$ may overlap each other in a range from $P_{MOPA}$min to $P_{MO}$max. A gap between the dynamic ranges of the pulse energy of the pulse laser beam outputted from the excimer laser device 1a may thus be suppressed.

The threshold value Ppa of the pulse energy may be set to a value between the maximum value $P_{MO}$max of the pulse energy $P_{MO}$ and the minimum value $P_{MOPA}$min of the pulse energy $P_{MOPA}$. As described later in detail with reference to FIG. 7, if the target value Pt of the pulse energy is lower than the threshold value Ppa of the pulse energy, the laser controller 19 may stop operation of the power amplifier PA and operate the master oscillator MO alone. If the target value Pt of the pulse energy is equal to or higher than the threshold value Ppa of the pulse energy, the laser controller 19 may operate the power amplifier PA synchronously with the master oscillator MO to amplify and output the pulse laser beam.

3.2.3 Details of Operation Setting

Figure 7:
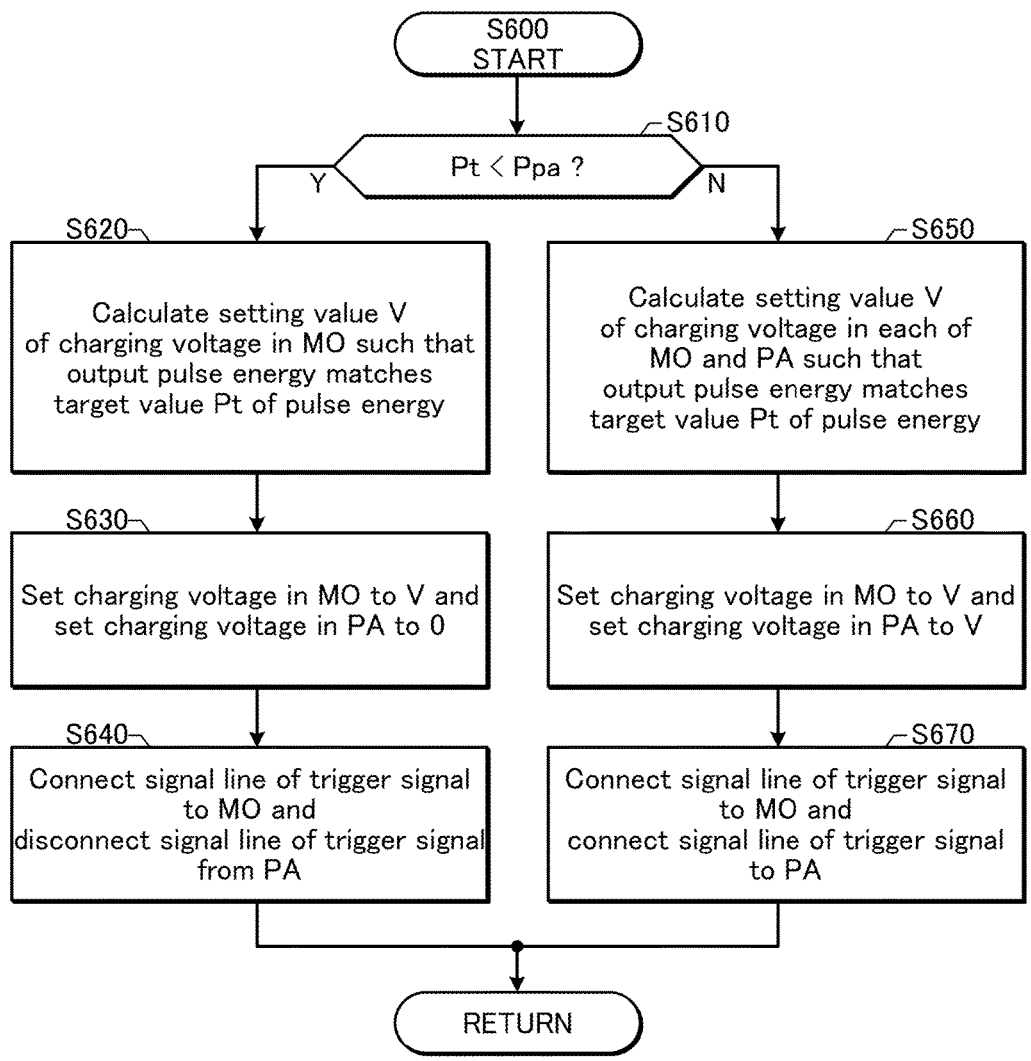
FIG. 7 is a flowchart showing details of a process shown in FIG. 3 to perform operation setting of a master oscillator MO and a power amplifier PA.

FIG. 7 is a flowchart showing details of the process shown in FIG. 3 to perform operation setting of the master oscillator MO and the power amplifier PA. The process shown in FIG. 7 may be performed by the laser controller 19 as a subroutine of S600 shown in FIG. 3. The laser controller 19 may perform the following process, according to the target value Pt of the pulse energy, to operate the master oscillator MO alone or synchronously operate the master oscillator MO and the power amplifier PA.

First, at S610, the laser controller 19 may determine whether the target value Pt of the pulse energy received from the laser anneal controller 29 is lower than the threshold value Ppa of the pulse energy.

At S610 described above, if the target value Pt of the pulse energy is lower than the threshold value Ppa of the pulse energy (S610: YES), the laser controller 19 may proceed to S620.

At S620, the laser controller 19 may calculate the setting value V of the charging voltage in the master oscillator MO such that the pulse energy outputted from the excimer laser device 1a matches the target value Pt of the pulse energy. This calculation may be performed, for example, based on the data describing the relationship between the setting value V of the charging voltage and the value of the pulse energy $P_{MO}$ described above with reference to FIG. 5.

Next, at S630, the laser controller 19 may set the charging voltage in the master oscillator MO to the setting value V calculated at S620. The laser controller 19 may set the charging voltage in the power amplifier PA to 0. Note that, however, the charging voltage in the power amplifier PA may not necessarily be 0. The charging voltage in the power amplifier PA may be a voltage at which an electric discharge does not occur between the pair of electrodes 11a and 11b.

Next, at S640, the laser controller 19 may connect a signal line of the trigger signal to the master oscillator MO. The laser controller 19 may disconnect a signal line of the trigger signal from the power amplifier PA.

According to the process from S620 to S640, the laser controller 19 may operate the master oscillator MO alone to allow the excimer laser device 1a to output the pulse laser beam with low pulse energy.

At S610 described above, if the target value Pt of the pulse energy is equal to or higher than the threshold value Ppa of the pulse energy (S610: NO), the laser controller 19 may proceed to S650.

At S650, the laser controller 19 may calculate the setting value V of the charging voltage in each of the master oscillator MO and the power amplifier PA such that the output pulse energy matches the target value Pt of the pulse energy. This calculation may be performed, for example, based on the data on the relationship between the setting value V of the charging voltage and the value of the pulse energy $P_{MOPA}$ described above with reference to FIG. 5.

Next, at S660, the laser controller 19 may set the charging voltage in the master oscillator MO and the charging voltage in the power amplifier PA each to the setting value V calculated at S650.

Next, at S670, the laser controller 19 may connect the signal line of the trigger signal to the master oscillator MO. The laser controller 19 may also connect the signal line of the trigger signal to the power amplifier PA.

According to the process from S650 to S670, the laser controller 19 may operate the master oscillator MO and the power amplifier PA to allow the excimer laser device 1a to output the pulse laser beam with high pulse energy.

After S640 or S670 described above, the laser controller 19 may end the process of this flowchart and return to the process of the main flow described with reference to FIG. 3.

3.2.4 First Modified Example of Operation Setting

Figure 8:
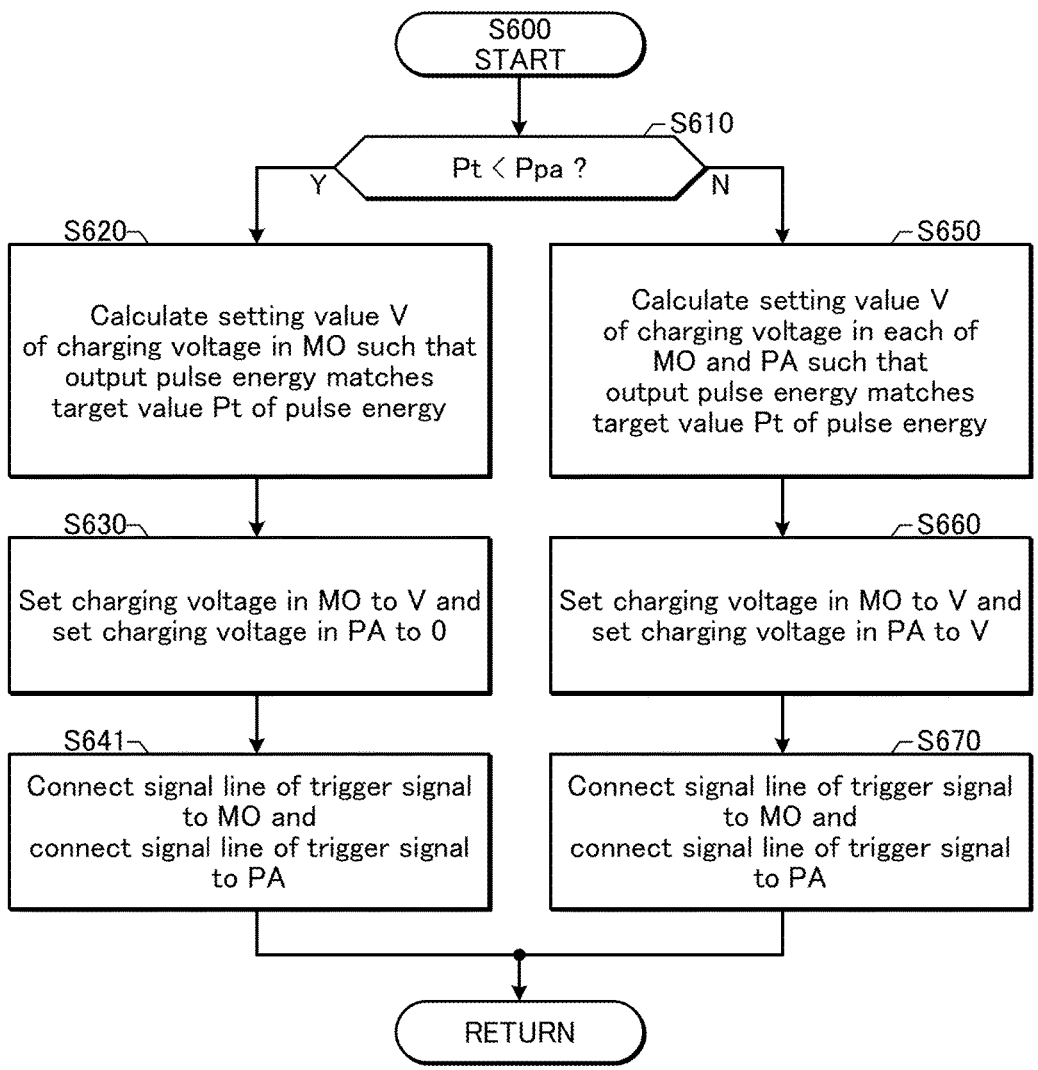
FIG. 8 is a flowchart showing a first modified example of the process shown in FIG. 3 to perform the operation setting of the master oscillator MO and the power amplifier PA.

FIG. 8 is a flowchart showing a first modified example of the process shown in FIG. 3 to perform the operation setting of the master oscillator MO and the power amplifier PA. The process shown in FIG. 8 may be performed by the laser controller 19 as a subroutine of S600 shown in FIG. 3. The process shown in FIG. 8 may be performed in place of the process described with reference to FIG. 7.

In the process shown in FIG. 8, the signal line of the trigger signal may be connected to the power amplifier PA (S641), even when the master oscillator MO is operated alone. Since the charging voltage in the power amplifier PA is set to 0 at S630 described above, the power amplifier PA may not be operated even when the signal line is connected.

In other aspects, the first modified example may be substantially the same as the process explained with reference to FIG. 7.

3.2.5 Second Modified Example of Operation Setting

Figure 9:
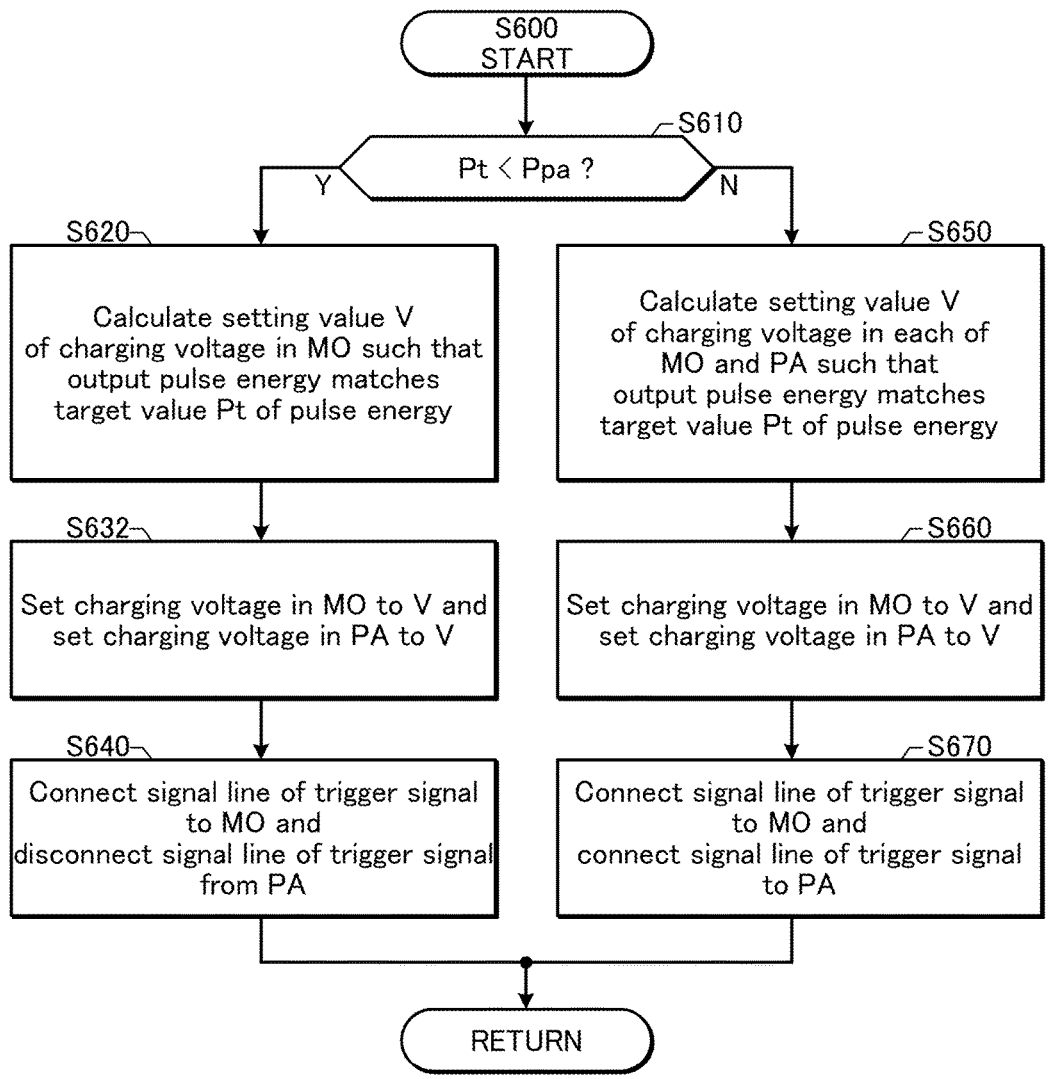
FIG. 9 is a flowchart showing a second modified example of the process shown in FIG. 3 to perform the operation setting of the master oscillator MO and the power amplifier PA.

FIG. 9 is a flowchart showing a second modified example of the process shown in FIG. 3 to perform the operation setting of the master oscillator MO and the power amplifier PA. The process shown in FIG. 9 may be performed by the laser controller 19 as a subroutine of S600 shown in FIG. 3. The process shown in FIG. 9 may be performed in place of the process described with reference to FIG. 7.

In the process shown in FIG. 9, the charging voltage in the power amplifier PA may be set to the setting value V (S632), even when the master oscillator MO is operated alone. Since the signal line of the trigger signal to the power amplifier PA is disconnected at S640 described above, the power amplifier PA may not be operated even when the charging voltage is set to the setting value V.

In other aspects, the second modified example may be substantially the same as the process explained with reference to FIG. 7.

3.2.6 Third Modified Example of Operation Setting

Figure 10:
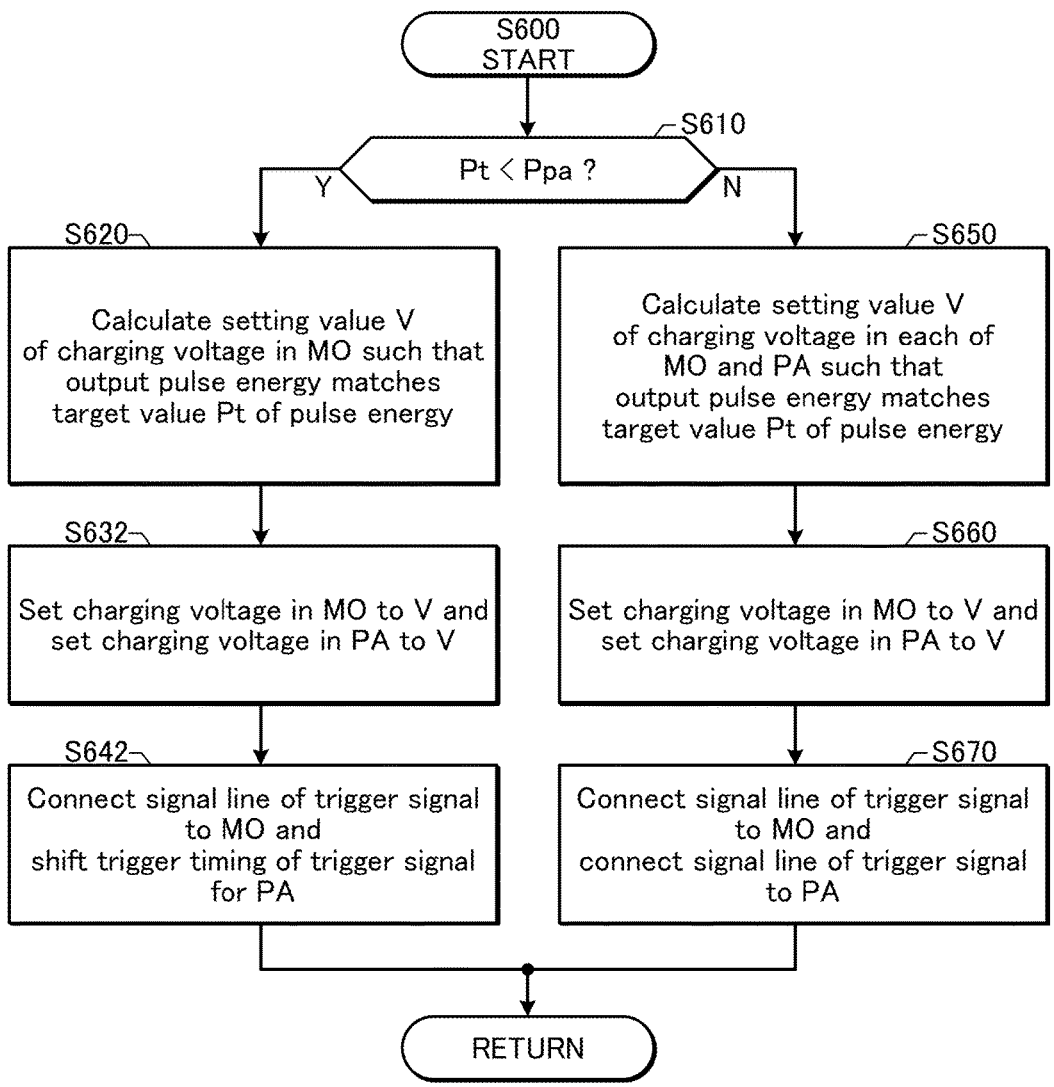
FIG. 10 is a flowchart showing a third modified example of the process shown in FIG. 3 to perform the operation setting of the master oscillator MO and the power amplifier PA.

FIG. 10 is a flowchart showing a third modified example of the process shown in FIG. 3 to perform the operation setting of the master oscillator MO and the power amplifier PA. The process shown in FIG. 10 may be performed by the laser controller 19 as a subroutine of S600 shown in FIG. 3. The process shown in FIG. 10 may be performed in place of the process described with reference to FIG. 9.

In the process shown in FIG. 10, if the target value Pt of the pulse energy is low, the trigger correction unit 16 of the power amplifier PA may be set to shift the trigger timing of the trigger signal for the power amplifier PA (S642). For example, the trigger timing for the power amplifier PA may be corrected such that the electric discharge occurs in the power amplifier PA at a time other than a time when the pulse laser beam passes through the power amplifier PA.

This may suppress the power amplifier PA to perform the amplifying operation even when the charging voltage in the power amplifier PA is set to the setting value V at S632.

In other aspects, the third modified example may be substantially the same as the process explained with reference to FIG. 9.

According to the first embodiment described above, whether or not the power amplifier PA amplifies the pulse laser beam is controlled based on the target value Pt of the pulse energy. Accordingly, the pulse energy may be changed in a wide range. Further, the pulse energy control in the first embodiment may be performed for each pulse. Further, loss of pulse energy at the attenuator may be suppressed and thus energy efficiency may be improved.

4. Laser Annealing System that Performs Adjusting Oscillation (Second Embodiment)

4.1 Configuration

Figure 11:
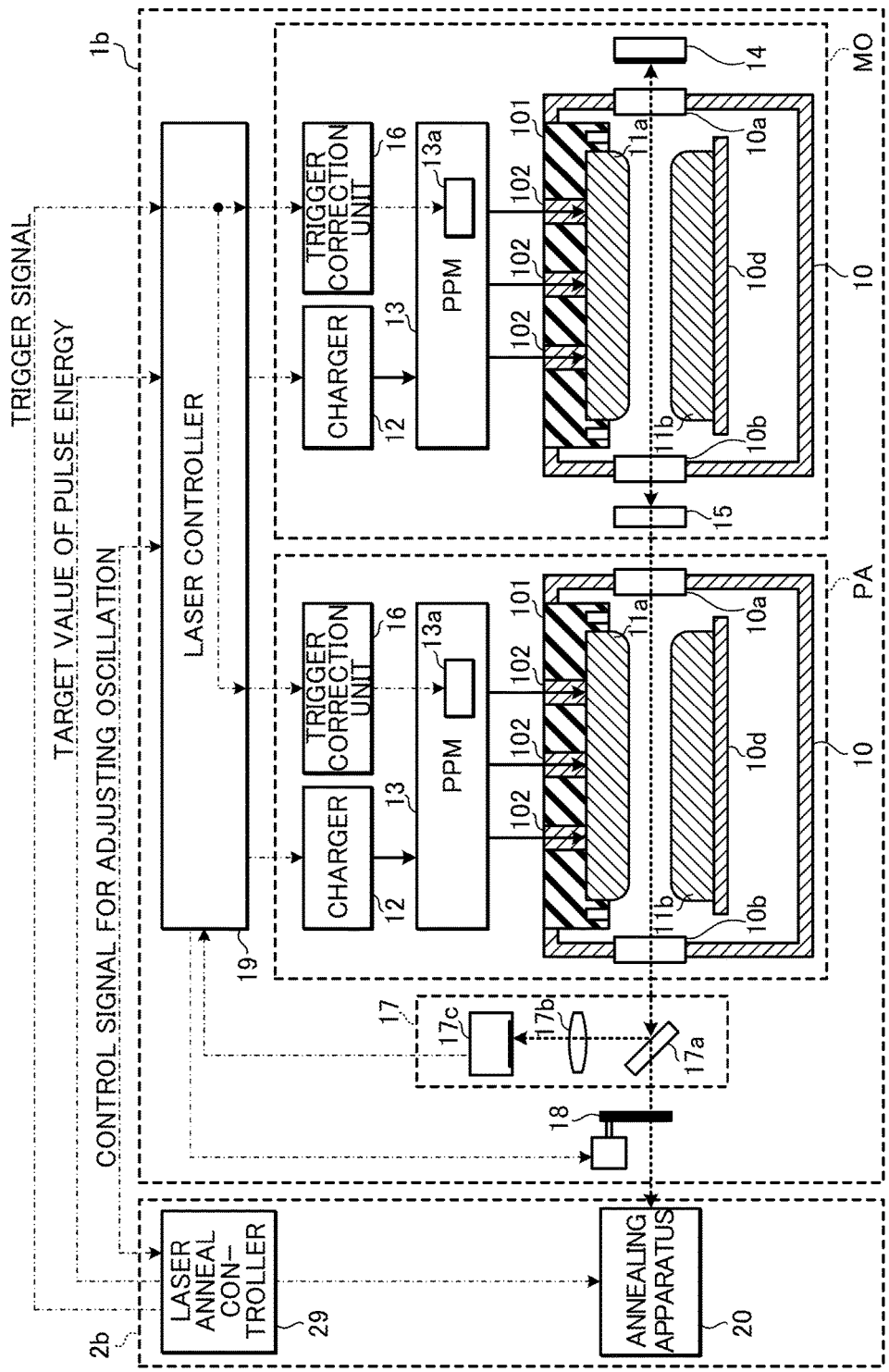
FIG. 11 schematically shows a configuration of a laser annealing system including an excimer laser device according to a second embodiment of the present disclosure.

FIG. 11 schematically shows a configuration of a laser annealing system including an excimer laser device according to a second embodiment of the present disclosure. The relationship between the setting value V of the charging voltage and the value of the output pulse energy explained in the first embodiment may change due to deterioration of the laser gas in the laser chamber 10. Thus, the second embodiment may perform an adjusting oscillation to obtain and update the data on the relationship between the setting value V of the charging voltage and the value of the output pulse energy.

In the second embodiment, a shutter 18 capable of opening/closing may be provided at the output end of the excimer laser device 1b. The shutter 18 may be in a closed state in the adjusting oscillation to suppress input of the pulse laser beam to the annealing apparatus 20.

Further, in the second embodiment, a signal line to send and receive a control signal for the adjusting oscillation may be connected between the laser controller 19 of the excimer laser device 1b and the laser anneal controller 29 of the laser annealing apparatus 2b.

4.2 Control of Pulse Energy 4.2.1 Main Flow

Figure 12:
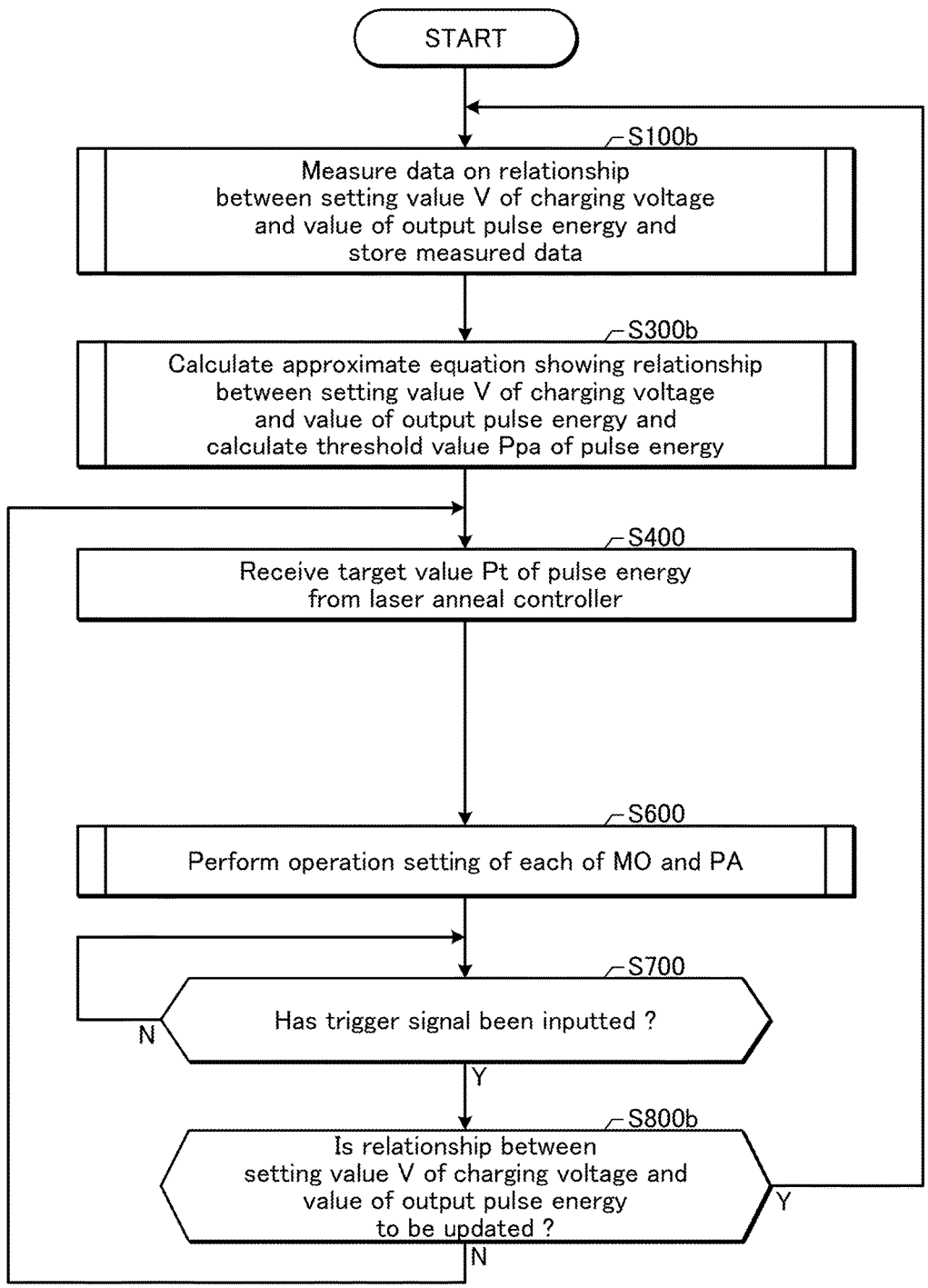
FIG. 12 is a flowchart showing a process performed by a laser controller shown in FIG. 11.

FIG. 12 is a flowchart showing a process performed by the laser controller shown in FIG. 11. As explained below, the laser controller 19 may perform the adjusting oscillation to update the data, in addition to controlling the output pulse energy.

First, at S100b, the laser controller 19 may measure data on the relationship between the setting value V of the charging voltage and the value of the output pulse energy, and store the measured data in the storage device. Specifically, the adjusting oscillation may be performed without outputting the pulse laser beam to the annealing apparatus 20, and the pulse energy may be measured during the adjusting oscillation.

Details of the process of S100b are described later with reference to FIG. 13.

Next, at S300b, the laser controller 19 may calculate an approximate equation showing the relationship between the setting value V of the charging voltage and the value of the output pulse energy and calculate the threshold value Ppa of the pulse energy. The approximate equation may be calculated based on the data on the pulse energy measured at S100b.

Details of the process of S300b are described later with reference to FIG. 16.

After S300b, the process from S400 to S700 may be substantially the same as the process in the first embodiment explained with reference to FIG. 3.

At S700, if the trigger signal has been inputted (S700: YES), the laser controller 19 may proceed to S800b.

At S800b, the laser controller 19 may determine whether the data on the relationship between the setting value V of the charging voltage and the value of the output pulse energy is to be updated. For example, if a predetermined time has passed since the preceding update of the data, the data may be updated. Alternatively, if an absolute value of a difference between the target value Pt of the pulse energy and the output pulse energy exceeds a predetermined value, the data may be updated.

If the data is to be updated (S800b: YES), the laser controller 19 may return to S100b described above to measure the relationship. If the data is not to be updated (S800b: NO), the laser controller 19 may return to S400 to continue to control the pulse energy based on the data that has been measured.

4.2.2 Details of Measuring Process

Figure 13:
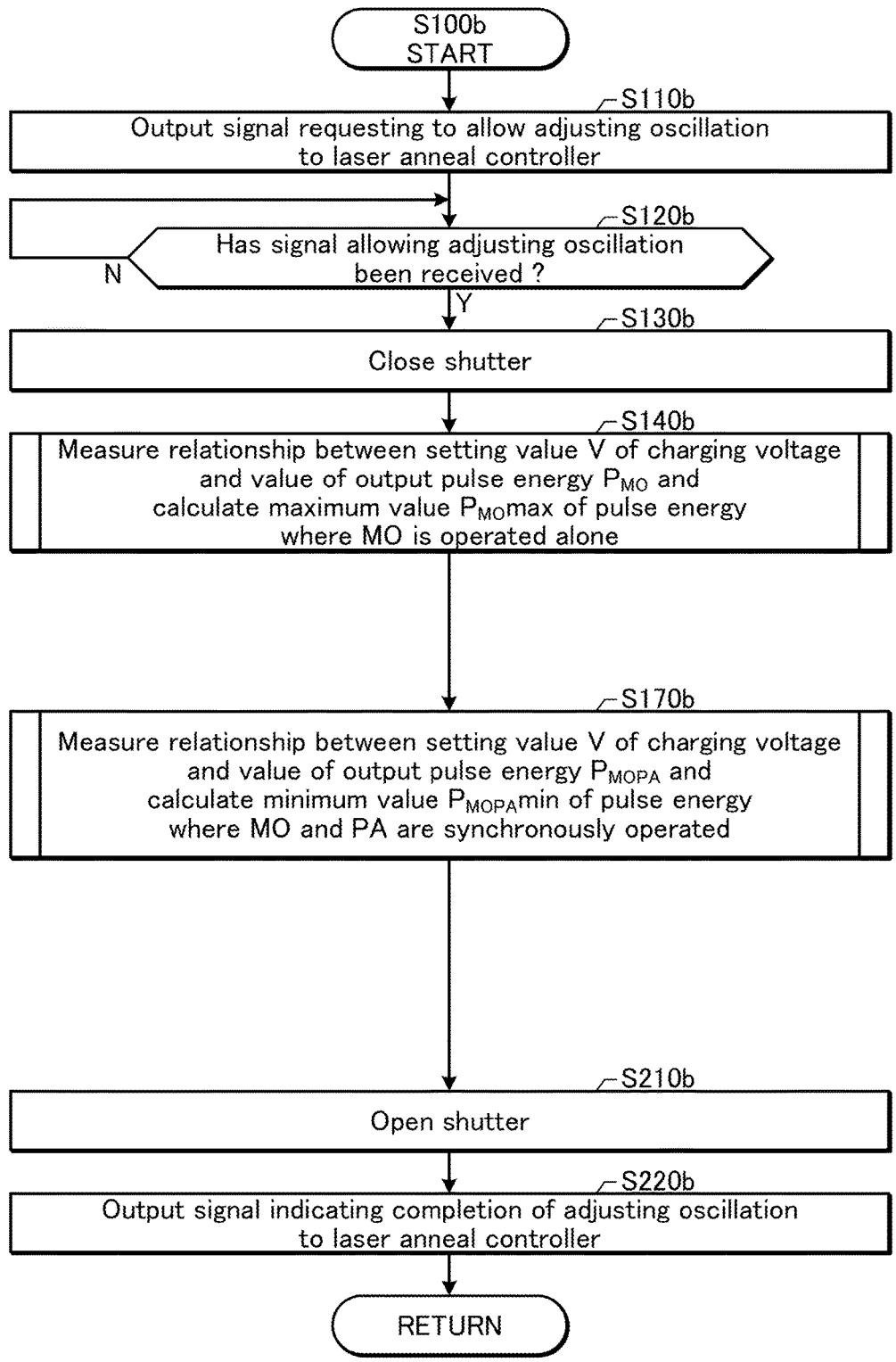
FIG. 13 is a flowchart showing details of a measuring process shown in FIG. 12.

FIG. 13 is a flowchart showing details of the measuring process shown in FIG. 12. The process shown in FIG. 13 may be performed by the laser controller 19 as a subroutine of S100b shown in FIG. 12. As explained below, the laser controller 19 may close the shutter 18 and perform the adjusting oscillation to measure the pulse energy with various setting values V of the charging voltage.

First, at S110b, the laser controller 19 may output a signal requesting to allow the adjusting oscillation to the laser anneal controller 29.

Next, at S120b, the laser controller 19 may determine whether the laser controller 19 has received a signal allowing the adjusting oscillation from the laser anneal controller 29. If the laser controller 19 has not received the signal allowing the adjusting oscillation (S120b: NO), the laser controller 19 may wait until it receives the signal allowing the adjusting oscillation. If the laser controller 19 has received the signal allowing the adjusting oscillation (S120b: YES), the laser controller 19 may proceed to S130b. During the adjusting oscillation, the laser anneal controller 29 may suspend control of a stage of a work piece to be subjected to the laser annealing.

At S130b, the laser controller 19 may close the shutter 18.

Next, at S140b, the laser controller 19 may measure data on the relationship between the setting value V of the charging voltage and the value of the output pulse energy $P_{MO}$ in the case where the master oscillator MO is operated alone. Further, the laser controller 19 may calculate, based on the measurement result, the maximum value $P_{MO}$max of the pulse energy in the case where the master oscillator MO is operated alone.

Details of the process of S140b are described later with reference to FIG. 14.

Next, at S170b, the laser controller 19 may measure data on the relationship between the setting value V of the charging voltage and the value of the output pulse energy $P_{MOPA}$ in the case where the master oscillator MO and the power amplifier PA are synchronously operated. Further, the laser controller 19 may calculate, based on the measurement result, the minimum value $P_{MOPA}$min of the pulse energy in the case where the master oscillator MO and the power amplifier PA are synchronously operated.

Details of the process of S170b are described later with reference to FIG. 15.

Next, at S210b, the laser controller 19 may open the shutter 18.

Next, at S220b, the laser controller 19 may output a signal indicating completion of the adjusting oscillation to the laser anneal controller 29.

After S220b, the laser controller 19 may end the process of this flowchart and return to the process of the main flow described with reference to FIG. 12.

Figure 14:
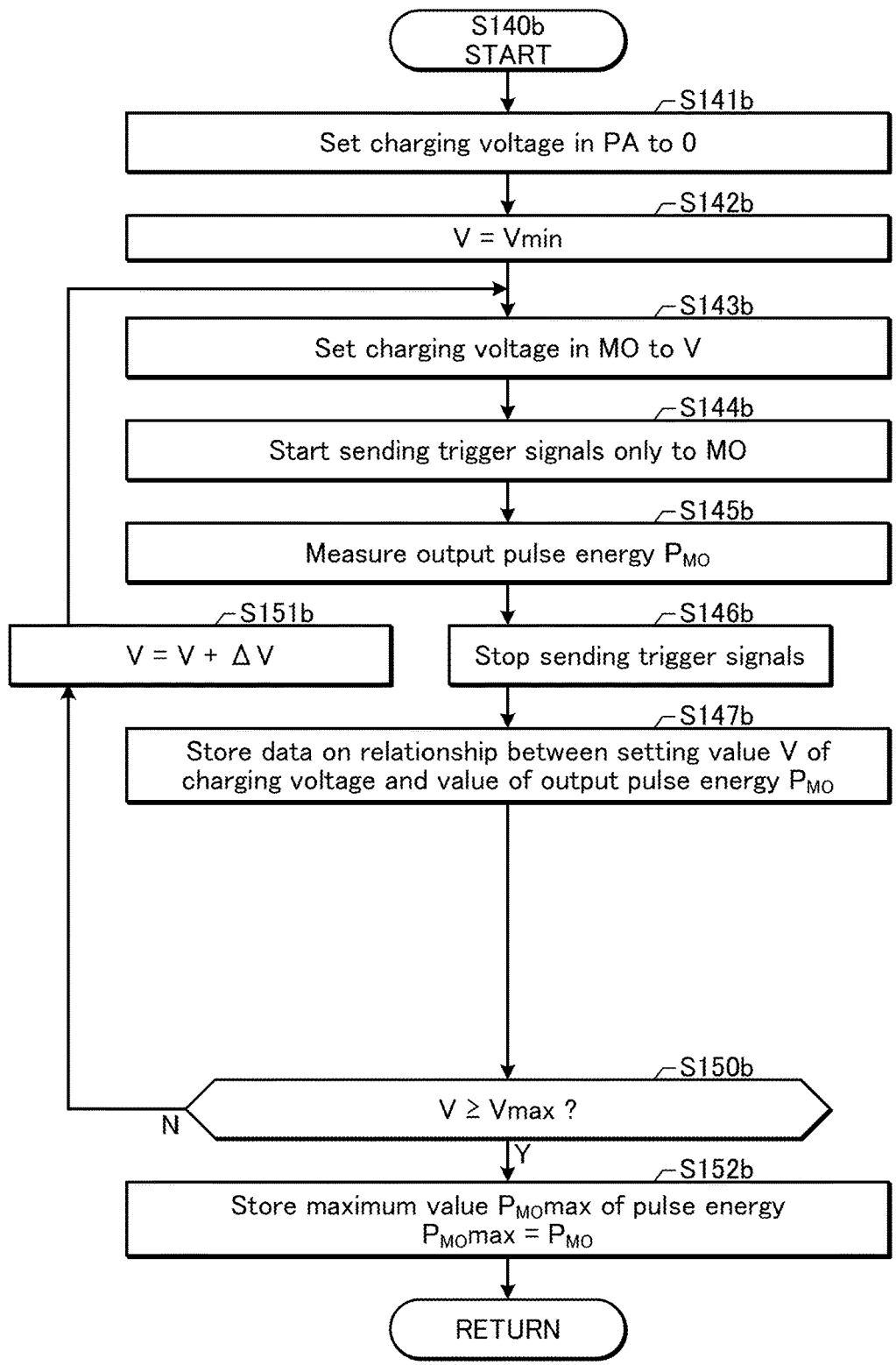
FIG. 14 is a flowchart showing details of the measuring process shown in FIG. 13 in the case where the MO is operated alone.

FIG. 14 is a flowchart showing details of the measuring process shown in FIG. 13 in the case where the MO is operated alone. The process shown in FIG. 14 may be performed by the laser controller 19 as a subroutine of S140b shown in FIG. 13. As explained below, the laser controller 19 may measure the pulse energy $P_{MO}$ with various setting values V of the charging voltage in a range from a minimum value Vmin to a maximum value Vmax.

First, at S141b, the laser controller 19 may set the charging voltage in the power amplifier PA to 0.

Next, at S142b, the laser controller 19 may set the setting value V of the charging voltage to the minimum value Vmin.

Next, at S143b, the laser controller 19 may set the charging voltage in the master oscillator MO to the setting value V.

Next, at S144b, the laser controller 19 may start sending trigger signals only to the master oscillator MO. The repetition frequency of the trigger signal may be substantially the same as that in actual laser annealing.

Next, at S145b, the laser controller 19 may measure the pulse energy $P_{MO}$ in the case where the master oscillator MO is operated alone based on the output signal from the pulse energy measuring unit 17.

Next, at S146b, the laser controller 19 may stop sending the trigger signals, which has started at S144b, to the master oscillator MO.

Next, at S147b, the laser controller 19 may store data on the relationship between the setting value V of the charging voltage and the value of the output pulse energy $P_{MO}$ in the storage device. The data on the relationship between the setting value V of the charging voltage and the value of the output pulse energy $P_{MO}$ may be stored in the table format described with reference to FIG. 5. For example, a combination of the current setting value V of the charging voltage set at S143b and the newest value of the pulse energy $P_{MO}$ measured at S145b may be stored.

The storage device is described later with reference to FIG. 29.

Next, at S150b, the laser controller 19 may determine whether the current setting value V of the charging voltage is equal to or higher than the maximum value Vmax.

At S150b, if the current setting value V of the charging voltage is lower than the maximum value Vmax (S150b: NO), the laser controller 19 may proceed to S151b.

At S151b, the laser controller 19 may update the setting value V of the charging voltage by adding a predetermined value ΔV to the current setting value V of the charging voltage. After S151b, the laser controller 19 may return to S143b described above to set the updated setting value V and measure the pulse energy $P_{MO}$ with the updated setting value V.

At S150b, if the current setting value V of the charging voltage is equal to or higher than the maximum value Vmax (S150b: YES), the laser controller 19 may proceed to S152b.

At S152b, the laser controller 19 may store the newest value of the pulse energy $P_{MO}$ measured at S145b, as the maximum value $P_{MO}$max of the pulse energy in the case where the master oscillator MO is operated alone, in the storage device.

After S152b, the laser controller 19 may end the process of this flowchart and return to the process described with reference to FIG. 13.

As described above, the laser controller 19 may measure the pulse energy $P_{MO}$ in the case where the master oscillator MO is operated alone with various setting values V of the charging voltage.

Figure 15:
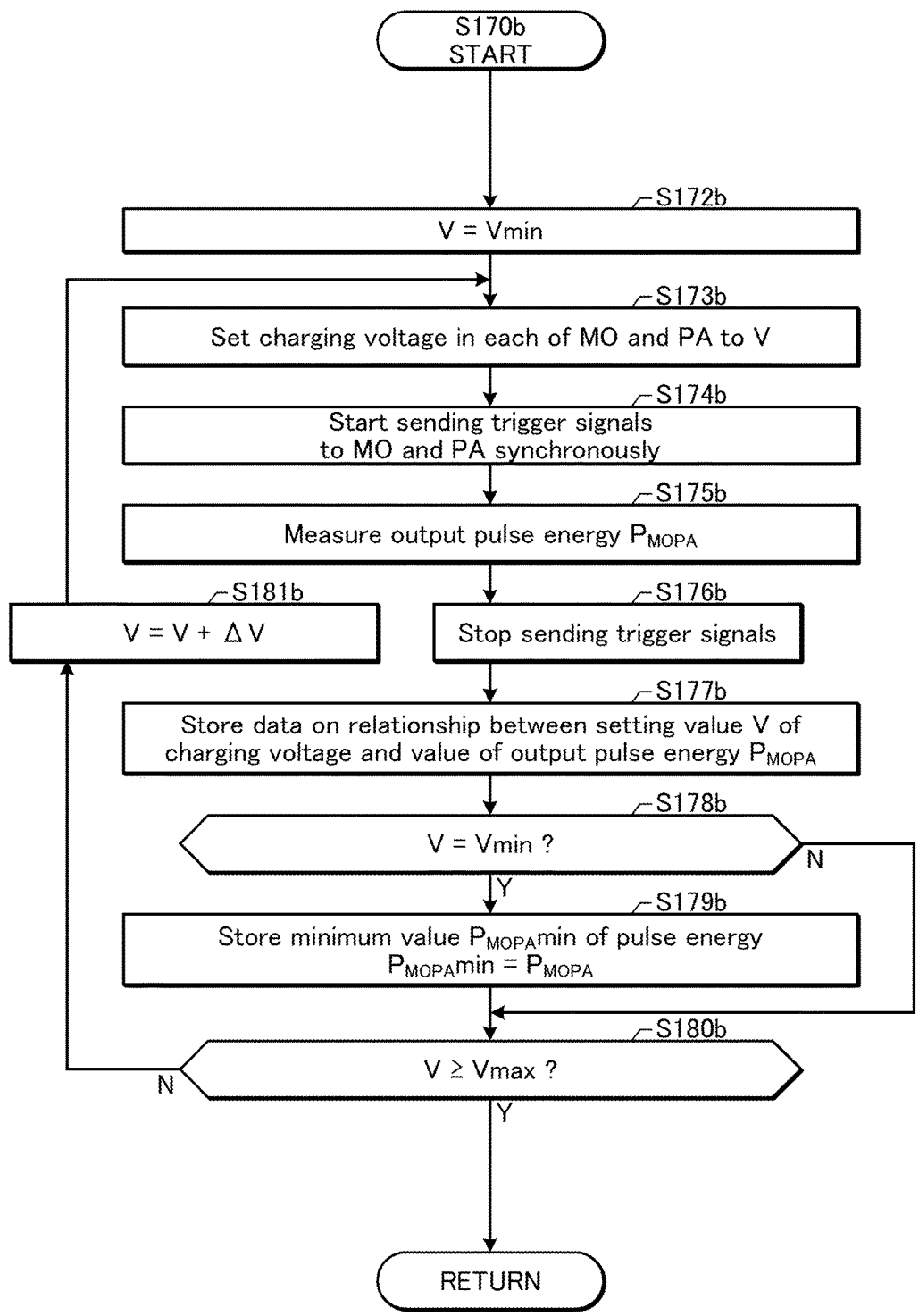
FIG. 15 is a flowchart showing details of the measuring process shown in FIG. 13 in the case where the MO and the PA are synchronously operated.

FIG. 15 is a flowchart showing details of the measuring process shown in FIG. 13 in the case where the MO and the PA are synchronously operated. The process shown in FIG. 15 may be performed by the laser controller 19 as a subroutine of S170b shown in FIG. 13. As explained below, the laser controller 19 may measure the pulse energy $P_{MOPA}$ with various setting values V of the charging voltage in the range from the minimum value Vmin to the maximum value Vmax.

First, at S172b, the laser controller 19 may set the setting value V of the charging voltage to the minimum value Vmin.

Next, at S173b, the laser controller 19 may set the charging voltage to the setting value V in each of the master oscillator MO and the power amplifier PA.

Next, at S174b, the laser controller 19 may start sending the trigger signals to the master oscillator MO and the power amplifier PA. The repetition frequency of the trigger signals may be substantially the same as that in actual laser annealing.

Next, at S175b, the laser controller 19 may measure the pulse energy $P_{MOPA}$ in the case where the master oscillator MO and the power amplifier PA are synchronously operated based on the output signal from the pulse energy measuring unit 17.

Next, at S176b, the laser controller 19 may stop sending the trigger signals, which have started at S174b, to the master oscillator MO and the power amplifier PA.

Next, at S177b, the laser controller 19 may store data on the relationship between the setting value V of the charging voltage and the value of the output pulse energy $P_{MOPA}$ in the storage device. The relationship between the setting value V of the charging voltage and the value of the output pulse energy $P_{MOPA}$ may be stored in the table format described above with reference to FIG. 5. For example, a combination of the current setting value V of the charging voltage set at S173b and the newest value of the pulse energy $P_{MOPA}$ measured at S175b may be stored.

The storage device is described later with reference to FIG. 29.

Next, at S178b, the laser controller 19 may determine whether the current setting value V of the charging voltage set at S173b is equal to the minimum value Vmin.

At S178b, if the current setting value V of the charging voltage is equal to the minimum value Vmin (S178b: YES), the laser controller 19 may proceed to S179b.

At S179b, the laser controller 19 may store the newest value of the pulse energy $P_{MOPA}$ measured at S175b as the minimum value $P_{MOPA}$min of the pulse energy in the storage device.

If the process at S179b has been completed, or if the current setting value V of the charging voltage at S178b is not equal to the minimum value Vmin (S178b: NO), the laser controller 19 may proceed to S180b.

At S180b, the laser controller 19 may determine whether the current setting value V of the charging voltage is equal to or higher than the maximum value Vmax.

At S180b, if the setting value V of the charging voltage is lower than the maximum value Vmax (S180b: NO), the laser controller 19 may proceed to S181b.

At S181b, the laser controller 19 ay update the setting value V of the charging voltage by adding a predetermined value ΔV to the current setting value V of the charging voltage. After S181b, the laser controller 19 may return to S173b described above to set the updated setting value V and measure the pulse energy $P_{MOPA}$ with the updated setting value V.

At S180b, if the setting value V of the charging voltage is equal to or higher than the maximum value Vmax (S180b: YES), the laser controller 19 may end the process of this flowchart to return to the process shown in FIG. 13.

As described above, the laser controller 19 may measure the pulse energy $P_{MOPA}$ in the case where the master oscillator MO and the power amplifier PA are synchronously operated with various setting values V of the charging voltage.

4.2.3 Details of Calculating Approximate Equations

Figure 16:
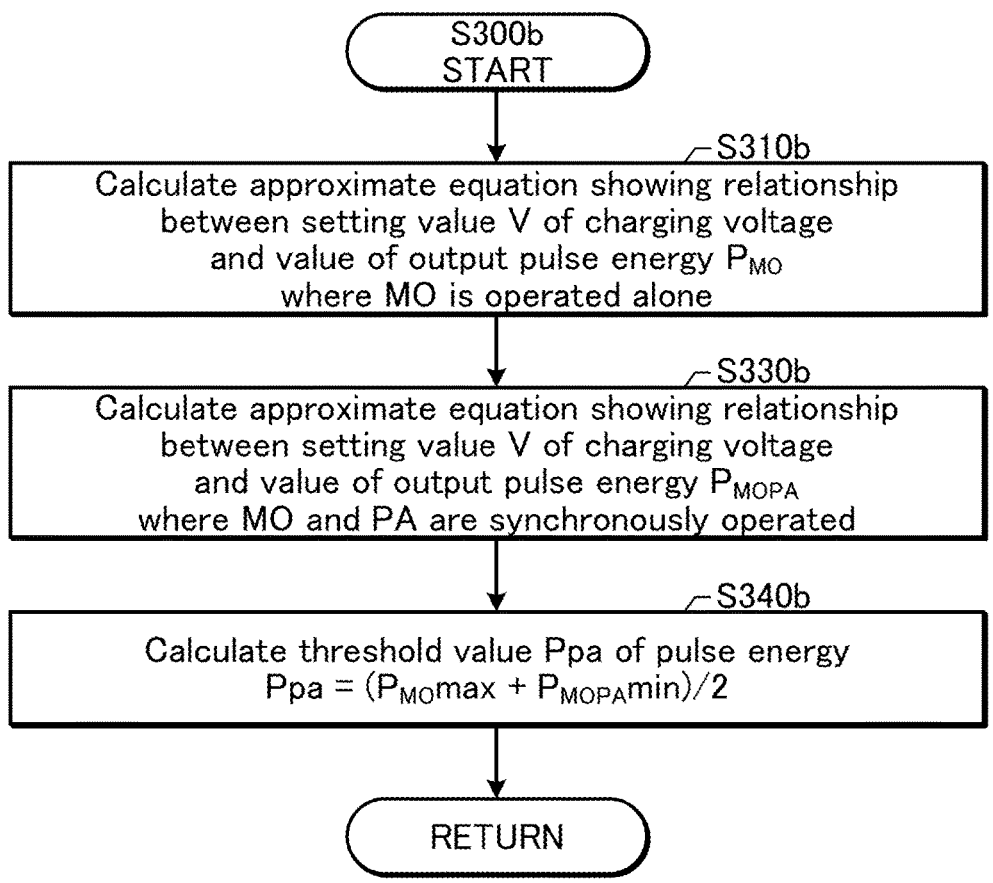

FIG. 16 is a flowchart showing details of the process shown in FIG. 12 to calculate approximate equations and the like. The process shown in FIG. 16 may be performed by the laser controller 19 as a subroutine of S300b shown in FIG. 12.

First, at S310b, the laser controller 19 may calculate an approximate equation showing the relationship between the setting value V of the charging voltage and the value of the output pulse energy $P_{MO}$ based on the measurement result measured at S100b described above. For example, an approximate equation shown below representing a third order curve may be calculated by a least squares method or the like.

$$E_{MO} = A_1 V^3 + B_1 V^2 + C_1 V + D_1$$

Next, at S330b, the laser controller 19 may calculate another approximate equation showing the relationship between the setting value V of the charging voltage and the value of the output pulse energy $P_{MOPA}$ based on the measurement result measured at S100b described above. For example, an approximate equation shown below representing a third order curve may be calculated by a least squares method or the like.

$$E_{MOPA} = A_2 V^3 + B_2 V^2 + C_2 V + D_2$$

Calculating the approximate equations described above may allow calculating the setting value V of the charging voltage by solving a third order equation when a target value Et of the pulse energy is given.

Next, at S340b, the laser controller 19 may calculate the threshold value Ppa of the pulse energy by the following formula.

$$Ppa = (P_{MO}\text{max} + P_{MOPA}\text{min})/2$$

Figure 17:
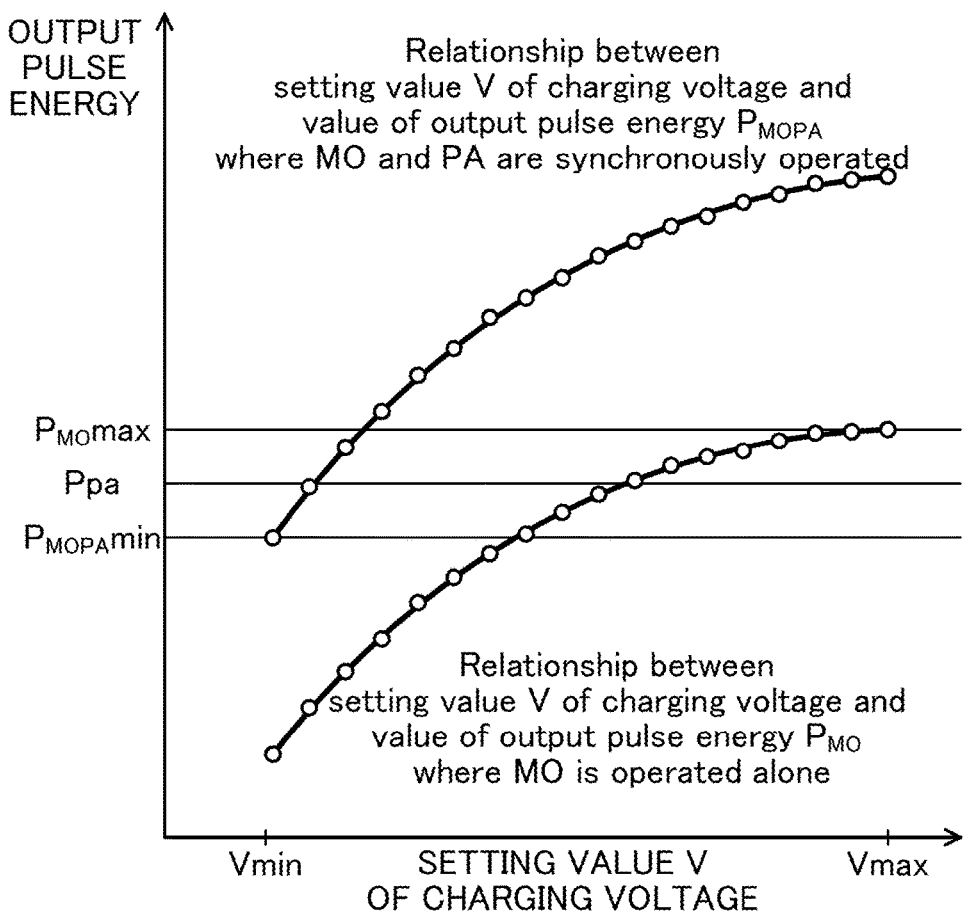
FIG. 17 shows an example of a threshold value Ppa of pulse energy and the relationship between the setting value V of the charging voltage and the value of the pulse energy.

FIG. 17 shows an example of the threshold value Ppa of the pulse energy and the relationship between the setting value V of the charging voltage and the value of the pulse energy. As shown in FIG. 17 with multiple small circles, the values of the pulse energy $P_{MO}$ and the values of the pulse energy $P_{MOPA}$ may be measured as discrete values depending on the setting value V of the charging voltage. The laser controller 19 may calculate the above-described approximate equations based on the discrete values.

The threshold value Ppa of the pulse energy may be an average of $P_{MO}$max and $P_{MOPA}$min. Therefore, the difference between the threshold value Ppa of the pulse energy and the maximum value $P_{MO}$max of the pulse energy and the difference between the threshold value Ppa of the pulse energy and the minimum value $P_{MOPA}$min of the pulse energy may be equivalent to each other. Thus, even when $P_{MO}$max or $P_{MOPA}$min changes, the threshold value Ppa of the pulse energy may not easily shift from the range between $P_{MO}$max and $P_{MOPA}$min.

According to the second embodiment, even when the characteristic of the excimer laser device 1b changes, the data on the relationship between the setting value V of the charging voltage and the value of the output pulse energy is updated and the pulse energy is adequately controlled.

In other aspects, the second embodiment may be substantially the same as the first embodiment.

5. Laser Annealing System Including a Plurality of Peer Amplifiers (Third Embodiment)

5.1 Configuration

Figure 18:
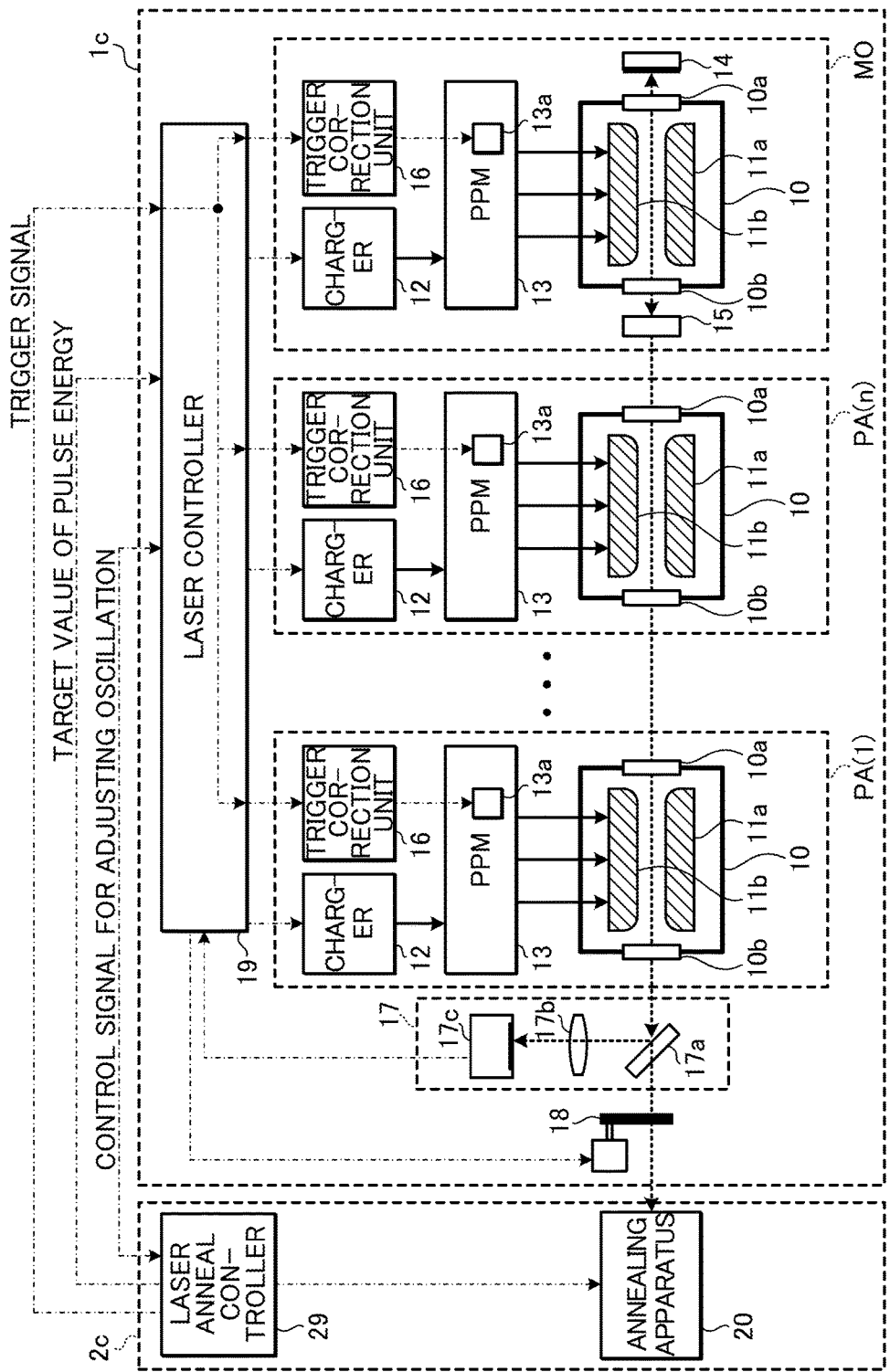
FIG. 18 schematically shows a configuration of a laser annealing system including an excimer laser device according to a third embodiment of the present disclosure.

FIG. 18 schematically shows a configuration of a laser annealing system including an excimer laser device 1c according to a third embodiment of the present disclosure. Thee third embodiment may be different from the first and second embodiments at the point where the excimer laser device 1c includes a plurality of power amplifiers from PA(1) to PA(n). In the third embodiment, n may be an integer that is 2 or more. The value of n may represent the number of power amplifiers included in the excimer laser device 1c. The configuration of each of the power amplifiers from. PA(1) to PA(n) may be substantially the same as that of the power amplifier PA in each of the first and second embodiments.

The power amplifiers from PA(1) to PA(n) may be arranged in a series connection in the numerical order from the downstream side in the optical path of the pulse laser beam. Namely, the power amplifier PA(n) may be arranged upstream of any other power amplifiers in the optical path of the pulse laser beam outputted from the master oscillator MO. An unillustrated power amplifier PA(n−1) may be arranged in the optical path of the pulse laser beam outputted from the power amplifier PA(n). The power amplifier PA(1) may be arranged downstream of any other power amplifiers in the optical path of the pulse laser beam.

As described in detail below, the third embodiment may determine the number of power amplifiers to be operated, of the power amplifiers from PA(1) to PA(n), based on the target value Pt of the pulse energy. The larger the number of power amplifiers to be operated is, the higher the output pulse energy is.

Further, when k power amplifiers of the power amplifiers from PA(1) to PA(n) are to be operated, the power amplifiers from PA(1) to PA(k) at the downstream side in the optical path of the pulse laser beam may be operated. Operation of the power amplifiers from PA(k+1) to PA(n) at the upstream side in the optical path of the pulse laser beam may be stopped.

If the upstream power amplifier PA(n) is operated and operation of the downstream power amplifier PA(1) is stopped, pulse energy of the pulse laser beam amplified in the upstream power amplifier PA(n) may be attenuated in the downstream power amplifier PA(1) at a predetermined ratio. In the third embodiment, the downstream power amplifier PA(1) is operated and operation of the upstream power amplifier PA(n) may be stopped to improve energy efficiency.

In the third embodiment, k may be a variable that may be set to any one of integers from 1 to n. The variable k may be used as a counter in the flowcharts described later.

At k=1, "from PA(1) to PA(k)" may mean PA(1) alone.

At k=n−1, "from PA(k+1) to PA(n)" may mean PA(n) alone.

At k=n, "from PA(k+1) to PA(n)" may mean that there is no power amplifier to be meant. Accordingly, at k=n, "stop operation of the power amplifiers from PA(k+1) to PA(n)" may mean that there is no power amplifier in which operation is to be stopped.

5.2 Control of Pulse Energy 5.2.1 Main Flow

Figure 19:
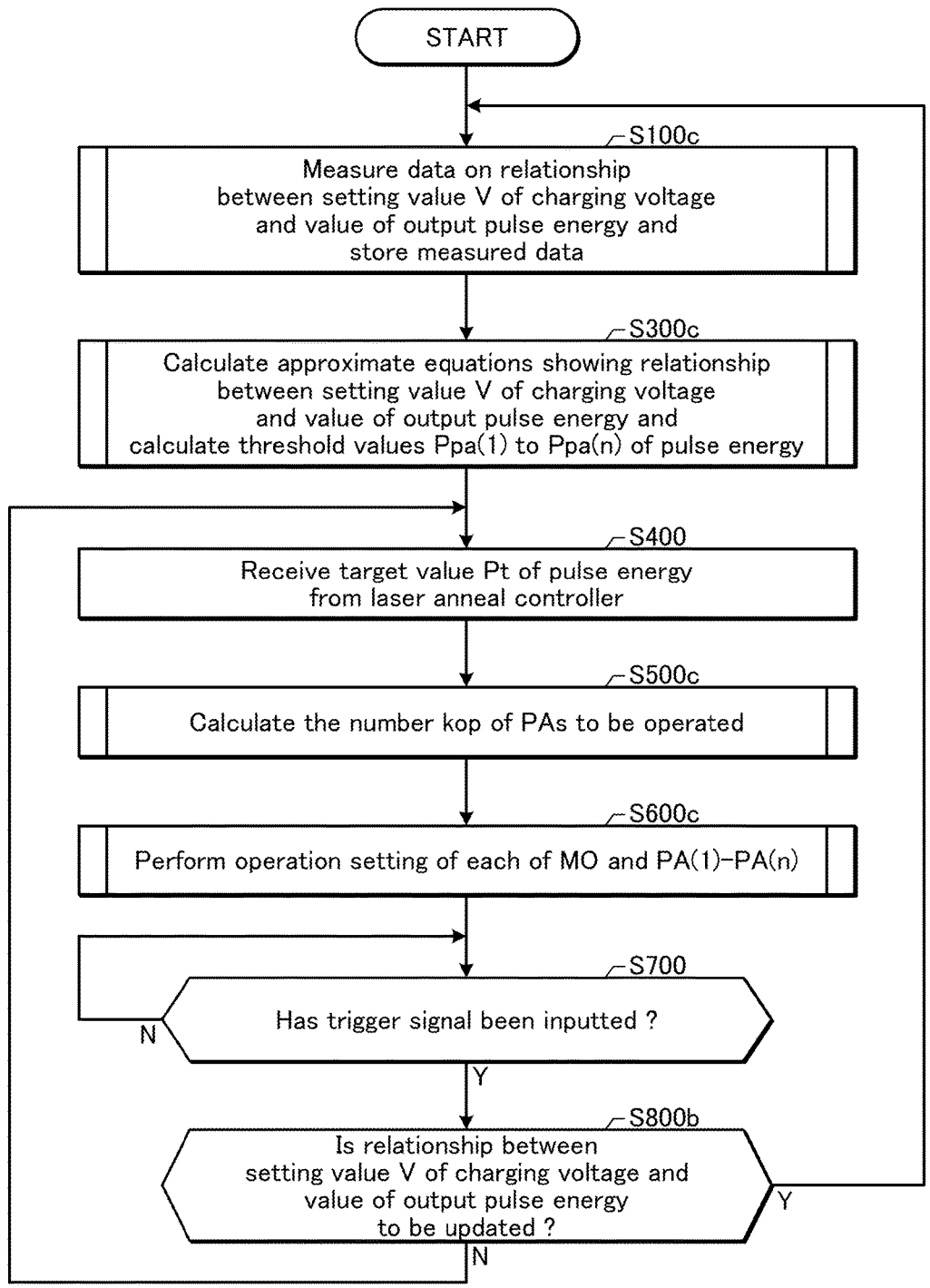
FIG. 19 is a flowchart showing a process performed by a laser controller shown in FIG. 18.

FIG. 19 is a flowchart showing a process performed by a laser controller shown in FIG. 18. In the third embodiment, the laser controller 19 may determine the number of power amplifiers to be operated for laser annealing, in the process described below based on the target value Pt of the pulse energy.

First, at S100c, the laser controller 19 may measure data on the relationship between the setting value V of the charging voltage and the value of the output pulse energy, and store the measured data in the storage device. This process in the third embodiment may be similar to the process of S100b in the second embodiment. However, the third embodiment may be different from the second embodiment at the point that the measurement is performed with various numbers of power amplifiers being operated.

Details of the process of S100c are described later with reference to FIG. 20.

Next, at S300c, the laser controller 19 may calculate approximate equations showing the relationship between the setting value V of the charging voltage and the value of the output pulse energy and calculate threshold values Ppa(1) to Ppa(n) of the pulse energy. This process in the third embodiment may be similar to the process of S300b in the second embodiment. However, the third embodiment may be different from the second embodiment at the point that the calculation is performed with various numbers of power amplifiers operated for the measurement.

Details of the process of S300c are described later with reference to FIG. 23.

Next, at S400, the laser controller 19 may read the target value Pt of the pulse energy from the laser anneal controller 29. This process may be substantially the same as that in the first embodiment explained with reference to FIG. 3.

Next, at S500c, the laser controller 19 may calculate the number kop of power amplifiers to be operated for the laser annealing. The number kop of power amplifiers to be operated for the laser annealing may be an integer in a range from 0 to n. When the target value Pt of the pulse energy is high, the number kop of power amplifiers to be operated for the laser annealing may be large. When the target value Pt of the pulse energy is low, the number kop of power amplifiers to be operated for the laser annealing may be small.

Details of the process of S500c are described later with reference to FIG. 24.

Next, at S600c, the laser controller 19 may perform operation setting of each of the master oscillator MO and the power amplifiers from PA(1) to PA(n). This process in the third embodiment may be similar to the process of S600 in each of the first and second embodiments. However, the third embodiment may be different from the first and second embodiments at the point that the process is performed according to the number kop of power amplifiers to be operated for the laser annealing.

Details of the process of S500c are described later with reference to FIG. 25.

Next, the process of S700 may be substantially the same as that explained in the first and second embodiments. Next, the process of S800b may be substantially the same as that explained in the second embodiment.

5.2.2 Details of Measuring Process

Figure 20:
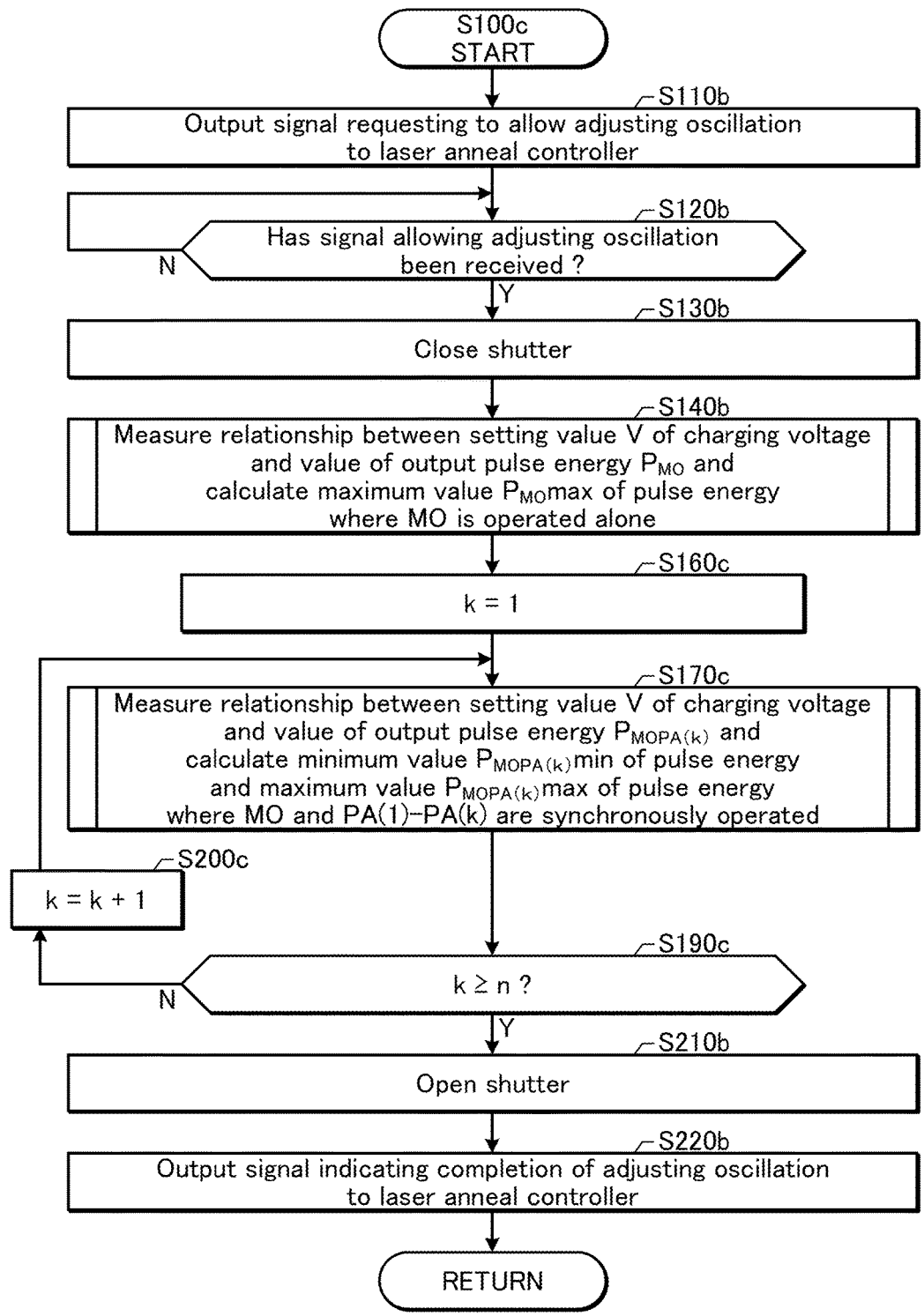
FIG. 20 is a flowchart showing details of a measuring process shown in FIG. 19.

FIG. 20 is a flowchart showing details of the measuring process shown in FIG. 19. The process shown in FIG. 20 may be performed by the laser controller 19 as a subroutine of S100c shown in FIG. 19. Similarly to the process of S100b in the second embodiment, the laser controller 19 may close the shutter 18 and perform the adjusting oscillation to measure the pulse energy with various setting values V of the charging voltage. However, as explained below, the third embodiment may perform the measurement with various numbers of power amplifiers being operated, of the power amplifiers from PA(1) to PA(n).

First, the process from S110b to S140b may be substantially the same as that in the second embodiment described with reference to FIG. 13. Also, details of the process of S140b may be substantially the same as that in the second embodiment described with reference to FIG. 14. In the process of S140b, the laser controller 19 may measure data on the relationship between the setting value V of the charging voltage and the value of the output pulse energy $P_{MO}$, and calculate the maximum value $P_{MO}$max of the pulse energy.

Next, at S160c, the laser controller 19 may set the value of the counter k to 1. The value of the counter k may correspond to the number k of power amplifiers to be operated for the measurement.

Next, at S170c, the laser controller 19 may measure data on the relationship between the setting value V of the charging voltage and the value of the output pulse energy $P_{MOPA(k)}$. Based on the measurement result, the laser controller 19 may calculate the minimum value $P_{MOPA(k)}$min of the pulse energy and the maximum value $P_{MOPA(k)}$max of the pulse energy.

Details of the process of S170c are described later with reference to FIG. 21.

Next, at S190c, the laser controller 19 may determine whether the value of the counter k is equal to or larger than n.

At S190c, if the value of the counter k is smaller than n (S190c: NO), the laser controller 19 may proceed to S200c.

At S200c, the laser controller 19 may update the counter k by adding 1 to the current value of the counter k. The laser controller 19 may then return to S170c described above to acquire the measurement result with more power amplifiers being operated.

At 3190c, if the value of the counter k is equal to or larger than n (S190c: YES), the laser controller 19 may proceed to S210b. The process from S210b to S220b may be substantially the same as that described in the second embodiment. After S220b, the laser controller 19 may end the process of this flowchart and return to the process of the main flow described with reference to FIG. 19.

Figure 21:
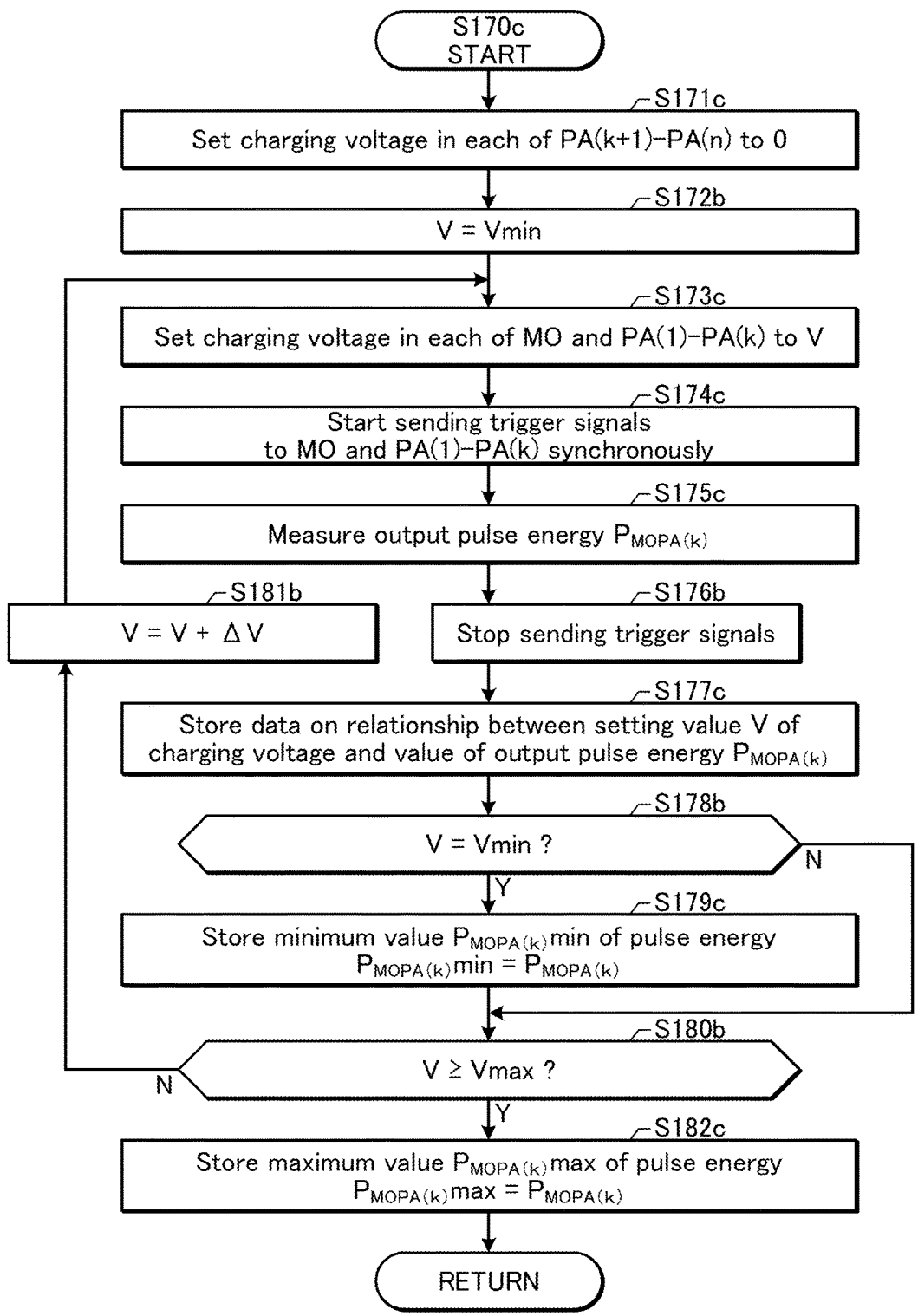
FIG. 21 is a flowchart showing details of the measuring process shown in FIG. 20 in the case where the MO and PA(1) to PA(k) are synchronously operated.

FIG. 21 is a flowchart showing details of the measuring process shown in FIG. 20 in the case where the MO and PA(1) to PA(k) are synchronously operated. The process shown in FIG. 21 may be performed by the laser controller 19 as a subroutine of S170c shown in FIG. 20. In the process shown in FIG. 21, the number k of power amplifiers to be operated for the measurement may be defined by the value of the counter k, which has been set at the process of S160c or S200c shown in FIG. 20.

As described below, the laser controller 19 may measure the pulse energy $P_{MOPA(k)}$ with various setting values V of the charging voltage ranged from the minimum value Vmin to the maximum value Vmax.

First, at S171c, the laser controller 19 may set the charging voltage to 0 in each of the power amplifiers from PA(k+1) to PA(n). Namely, the power amplifiers from PA(k+1) to PA(n) may each be set to stop operation.

Next, at S172b, the laser controller 19 may set the setting value V of the charging voltage to the minimum value Vmin.

Next, at S173c, the laser controller 19 may set the charging voltage to the setting value V in each of the master oscillator MO and the power amplifiers from PA(1) to PA(k).

Next, at S174c, the laser controller 19 may start sending the trigger signals to the master oscillator MO and to the power amplifiers from PA(1) to PA(k). The repetition frequency of the trigger signals may be substantially the same as that in actual laser annealing.

Next, at S175c, the laser controller 19 may measure the pulse energy $P_{MOPA(k)}$ based on the output signal from the pulse energy measuring unit 17.

Next, at S176b, the laser controller 19 may stop sending the trigger signals, which has been started at S174c, to the master oscillator MO and the power amplifiers from PA(1) to PA(k).

Next, at S177c, the laser controller 19 may store the data on the relationship between the setting value V of the charging voltage and the value of the output pulse energy $P_{MOPA(k)}$ in the storage device. For example, a combination of the current setting value V of the charging voltage set at S173c and the newest value of the pulse energy $P_{MOPA(k)}$ measured at S175c may be stored.

The storage device is described later with reference to FIG. 29.

Next, at S178b, the laser controller 19 may determine whether the current setting value V of the charging voltage set at S173c is equal to the minimum value Vmin.

At S178b, if the current setting value V of the charging voltage is equal to the minimum value Vmin (S178b: YES), the laser controller 19 may proceed to S179c.

At S179c, the laser controller 19 may store the newest value of the pulse energy $P_{MOPA(k)}$ measured at S175c as the minimum value $P_{MOPA(k)}$min of the pulse energy in the storage device.

If the process at S179c is completed, or if the current setting value V of the charging voltage at S178b is not equal to the minimum value Vmin (S178b: NO), the laser controller 19 may proceed to S180b.

At S180b, the laser controller 19 may determine whether the current setting value V of the charging voltage is equal to or higher than the maximum value Vmax.

At S180b, if the setting value V of the charging voltage is lower than the maximum value Vmax (S180b: NO), the laser controller 19 may proceed to S181b.

At S181b, the laser controller 19 may update the setting value V of the charging voltage by adding a predetermined value ΔV to the current setting value V of the charging voltage. After S181b, the laser controller 19 may return to S173c described above, set the updated setting value V, and measure the pulse energy $P_{MOPA(k)}$ with the updated setting value V.

At S180b, if the setting value V of the charging voltage is equal to or higher than the maximum value Vmax (S180b: YES), the laser controller 19 may proceed to S182c.

At S182c, the laser controller 19 may store the newest value of the pulse energy $P_{MOPA(k)}$ measured at S175c as the maximum value $P_{MOPA(k)}$max of the pulse energy in the storage device.

After S182c, the laser controller 19 may end the process of this flowchart to return to the process shown in FIG. 19.

As described above, the laser controller 19 may measure the pulse energy $P_{MOPA(k)}$ with various setting values V of the charging voltage.

Figure 22:
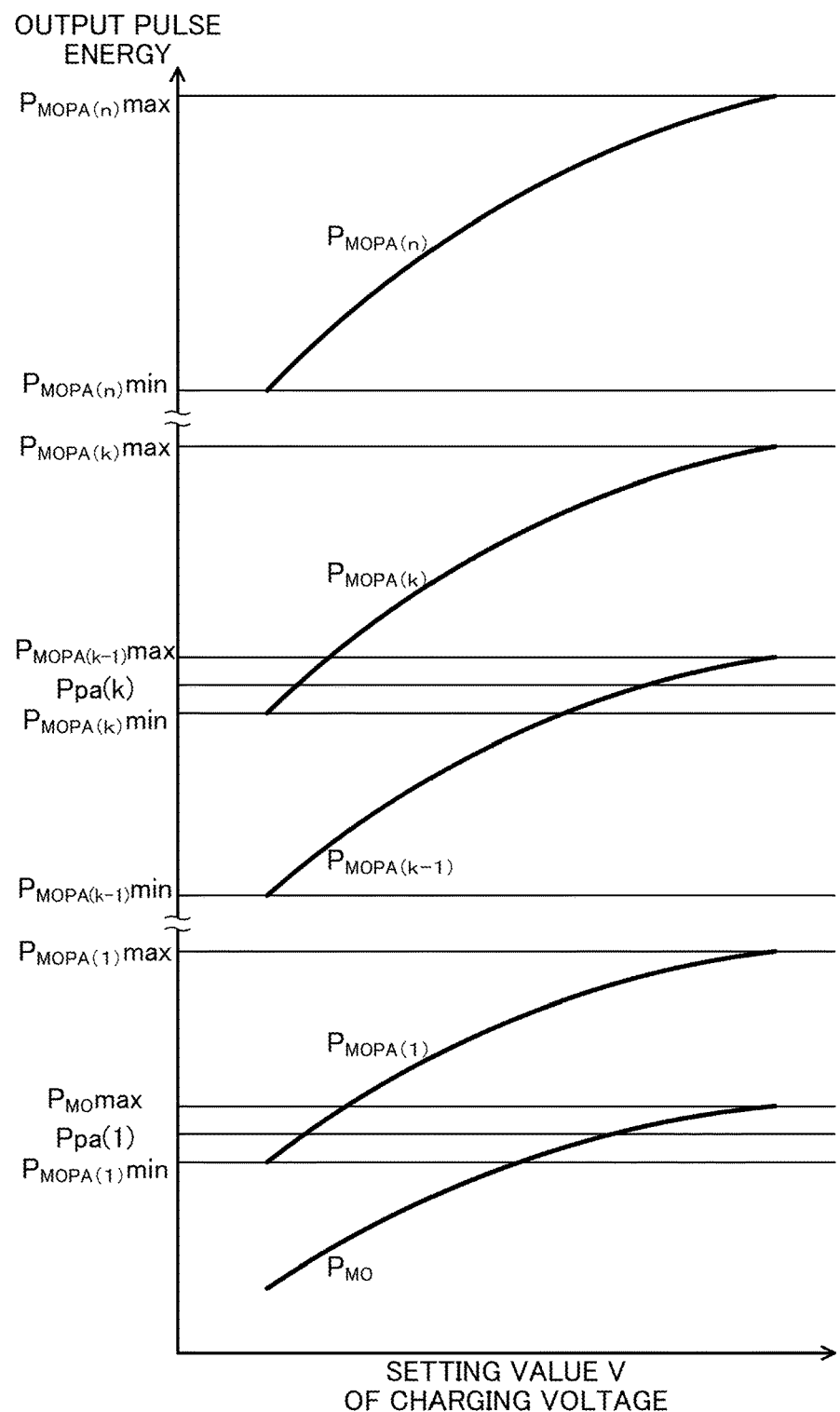
FIG. 22 shows an example of a threshold value Ppa(k) of pulse energy and the relationship between the setting value V of the charging voltage and the value of the pulse energy.

FIG. 22 shows an example of a threshold value Ppa(k) of the pulse energy and the relationship between the setting value V of the charging voltage and the value of the output pulse energy. As shown in FIG. 22, the higher the setting value V of the charging voltage is, the higher the value of the pulse energy $P_{MO}$ in the case where the master oscillator MO is operated alone is. Further, the higher the setting value V of the charging voltage is, the higher the value of the pulse energy $P_{MOPA(k)}$ in the case where the master oscillator MO and the power amplifiers from PA(1) to PA(k) are synchronously operated is.

With the same setting value V of the charging voltage, the pulse energy $P_{MOPA(k)}$ may be higher than the pulse energy $P_{MO}$. The larger the number k of power amplifiers to be operated is, the higher the pulse energy $P_{MOPA(k)}$ is.

The maximum value $P_{MOPA(k-1)}$max of the pulse energy $P_{MOPA(k-1)}$ may be higher than the minimum value $P_{MOPA(k)}$min of the pulse energy $P_{MOPA(k)}$. This may allow the dynamic range of the pulse energy $P_{MOPA(k-1)}$ and the dynamic range of the pulse energy $P_{MOPA(k)}$ to overlap each other in a range from $P_{MOPA(k)}$min to $P_{MOPA(k-1)}$max. A gap between the dynamic ranges of the pulse energy of the pulse laser beam outputted from the excimer laser device 1c may thus be suppressed.

The threshold value Ppa(k) of the pulse energy may be set to a value between the maximum value $P_{MOPA(k-1)}$max of the pulse energy $P_{MOPA(k-1)}$ and the minimum value $P_{MOPA(k)}$min of the pulse energy $P_{MOPA(k)}$. As described later, if the target value Pt of the pulse energy is lower than the threshold value Ppa(k) of the pulse energy, the laser controller 19 may synchronously operate the master oscillator MO and the power amplifiers from PA(1) to PA(k−1) and stop operation of the other power amplifiers.

5.2.3 Details of Calculating Approximate Equations

Figure 23:
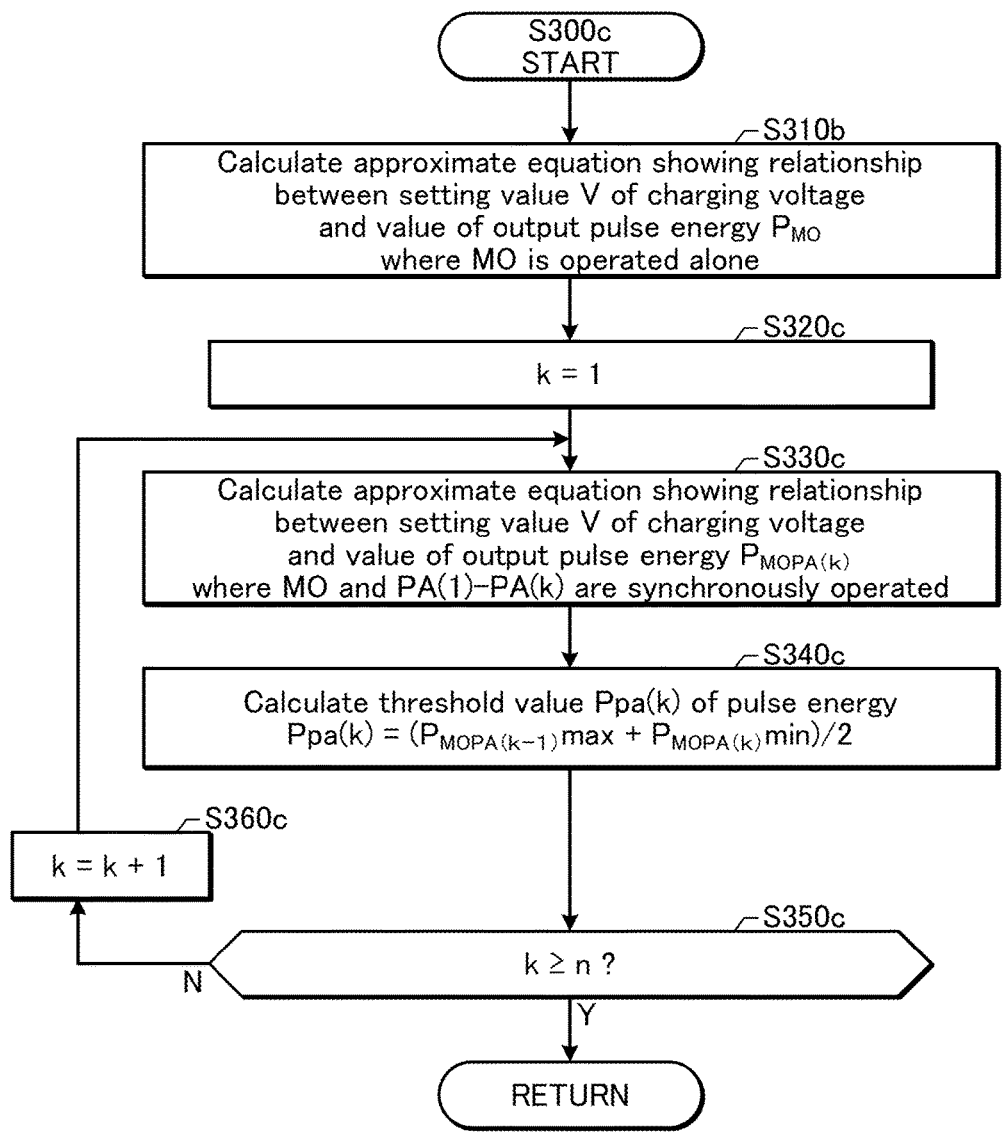

FIG. 23 is a flowchart showing details of the process shown in FIG. 19 to calculate approximate equations and the like. The process shown in FIG. 23 may be performed by the laser controller 19 as a subroutine of S300c shown in FIG. 19.

First, at S310b, the laser controller 19 may calculate an approximate equation showing the relationship between the setting value V of the charging voltage and the value of the output pulse energy $P_{MO}$ based on the measurement result of S100c described above. For example, an approximate equation shown below representing a third order curve may be calculated by a least squares method or the like.

$$E_{MO}=A_1V^3+B_1V^2+C_1V+D_1$$

Next, at S320c, the laser controller 19 may set the value of the counter k to 1.

Next, at S330c, the laser controller 19 may calculate another approximate equation showing the relationship between the setting value V of the charging voltage and the value of the output pulse energy $P_{MOPA(k)}$ based on the measurement result measured at S100c described above. For example, an approximate equation shown below representing a third order curve may be calculated by a least squares method or the like.

$$E_{MOPA(k)}=A_2V^3+B_2V^2+C_2V+D_2$$

Next, at S340c, the laser controller 19 may calculate a threshold value Ppa(k) of the pulse energy for determining whether the kth power amplifier PA(k) is to be operated by the following formula.

$$Ppa(k)=(P_{MOPA}(k-1)\max+P_{MOPA(k)}\min)/2$$

When the value of k is 1, $P_{MOPA(k-1)}$max may be equivalent to $P_{MO}$max calculated at S140b shown in FIG. 13.

Next, at S350c, the laser controller 19 may determine whether the value of the counter k is equal to or larger than n.

At S350c, if the value of the counter k is smaller than n (S350c: NO), the laser controller 19 may proceed to S360c.

At S360c, the laser controller 19 may update the counter k by adding 1 to the current value of the counter k, and return to S330c described above. Approximate equations with more power amplifiers being operated may then be calculated.

At S350c, if the value of the counter k is equal to or larger than n (S350c: YES), the laser controller 19 may end the process of this flowchart and return to the process of the main flow described with reference to FIG. 19.

5.2.4 Details of Calculating the Number of Power Amplifiers to be Operated

Figure 24:
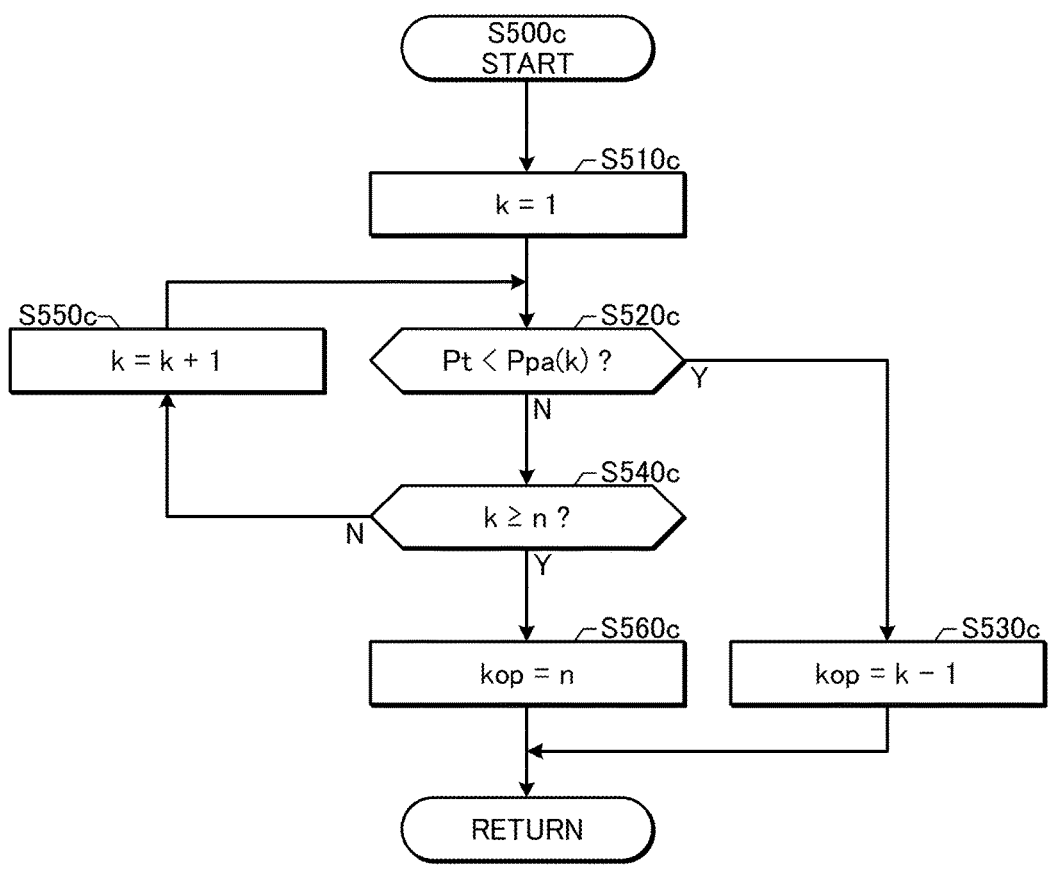
FIG. 24 is a flowchart showing details of a process shown in FIG. 19 to calculate the number of power amplifiers to be operated.

FIG. 24 is a flowchart showing details of the process shown in FIG. 19 to calculate the number of power amplifiers to be operated. The process shown in FIG. 24 may be performed by the laser controller 19 as a subroutine of S500c shown in FIG. 19.

As explained below, the target value Pt of the pulse energy may be compared to each of the threshold values of the pulse energy in the order from the lowest threshold value Ppa(1) of the pulse energy. Based on the result of these comparisons, the number kop of power amplifiers to be operated for the laser annealing may be determined.

When the target value Pt of the pulse energy is high, the number kop of power amplifiers to be operated for the laser annealing may be large. When the target value Pt of the pulse energy is low, the number kop of power amplifiers to be operated for the laser annealing may be small.

First, at S510c, the laser controller 19 may set the value of the counter k to 1. The value of the counter k may define which one of the threshold values Ppa(1) to Ppa(n) of the pulse energy is to be compared with the target value Pt of the pulse energy.

Next, at S520c, the laser controller 19 may compare the target value Pt of the pulse energy and the threshold value Ppa(k) of the pulse energy, and determine whether the target value Pt of the pulse energy is lower than the threshold value Ppa(k) of the pulse energy.

If the target value Pt of the pulse energy is lower than the threshold value Ppa(k) of the pulse energy (S520c: YES), the laser controller 19 may proceed to S530c.

At S530c, the laser controller 19 may set the number kop of power amplifiers to be operated for the laser annealing to a value obtained by subtracting 1 from the current value of the counter k, namely, k−1.

If the target value Pt of the pulse energy is not lower than the threshold value Ppa(k) of the pulse energy (S520c: NO), the laser controller 19 may proceed to S540c.

At S540c, the laser controller 19 may determine whether the value of the counter k is equal to or larger than n.

At S540c, if the value of the counter k is smaller than n (S540c: NO), the laser controller 19 may proceed to S550c.

At S550c, the laser controller 19 may update the counter k by adding 1 to the current value of the counter k, and return to S520c described above. The target value Pt of the pulse energy may then be compared with another threshold value Ppa(k) of the pulse energy.

At S540c, if the value of the counter k is equal to or larger than n (S540c: YES), the laser controller 19 may proceed to S560c.

At S560c, the laser controller 19 stay set the number kop of power amplifiers to be operated for the laser annealing to n.

After S530c or S560c described above, the laser controller 19 may end the process of this flowchart and return to the process of the main flow described with reference to FIG. 19.

5.2.5 Details of Operation Setting

Figure 25:
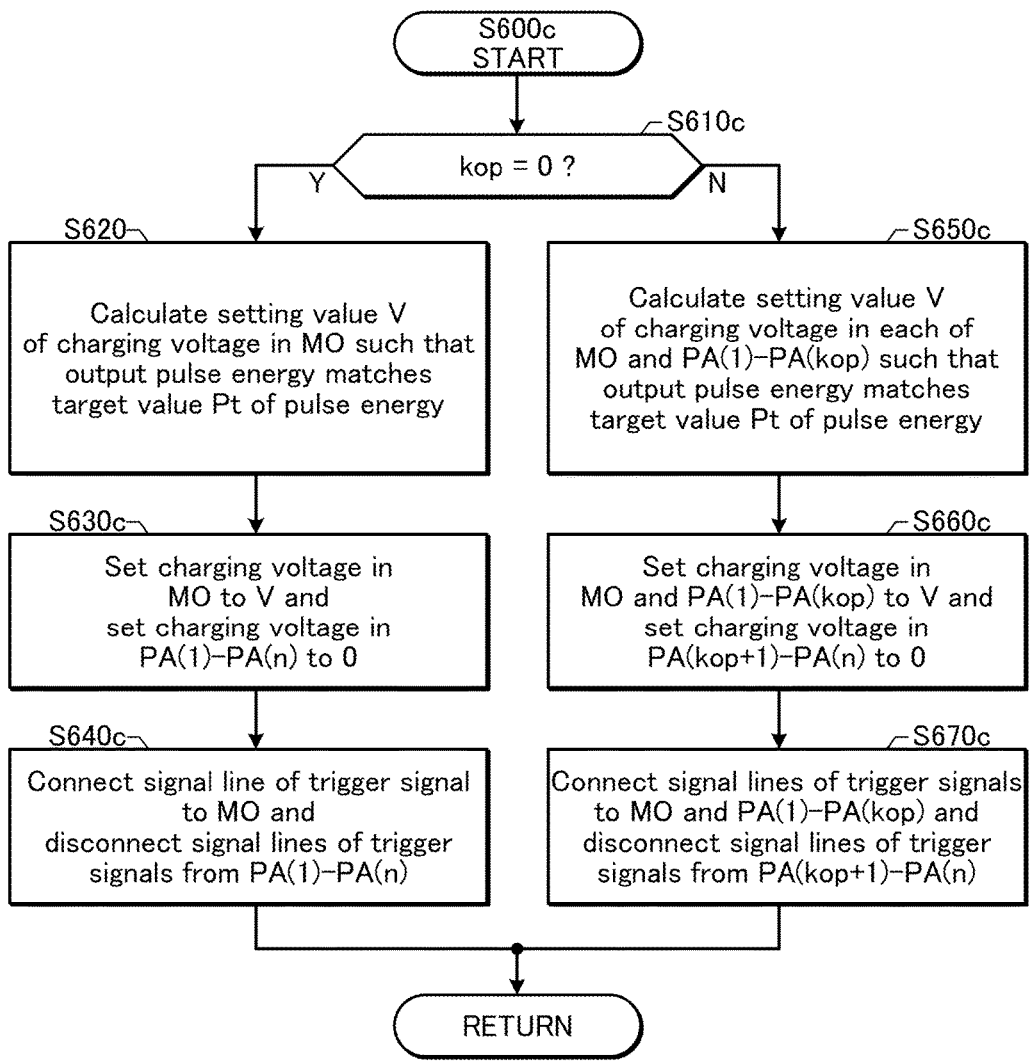
FIG. 25 is a flowchart showing details of a process shown in FIG. 19 to perform operation setting of the master oscillator MO and a plurality of power amplifiers from PA(1) to PA(n).

FIG. 25 is a flowchart showing details of a process shown in FIG. 19 to perform the operation setting of the master oscillator MO and a plurality of power amplifiers from PA(1) to PA(n). The process shown in FIG. 25 may be performed by the laser controller 19 as a subroutine of S600c shown in FIG. 19. In the following process, the laser controller 19 may operate the master oscillator MO alone or operate the master oscillator MO and kop power amplifiers synchronously based on the number kop of power amplifiers to be operated for the laser annealing.

First, at S610c, the laser controller 19 may determine whether the number kop of power amplifiers to be operated for the laser annealing decided at S500c is 0.

At S610c described above, if the number kop of power amplifiers to be operated for the laser annealing is 0 (S610c: YES), the laser controller 19 may proceed to S620.

At S620, the laser controller 19 may calculate the setting value V of the charging voltage in the master oscillator MO such that the output pulse energy matches the target value Pt of the pulse energy. This calculation may be performed, for example, based on the relationship between the setting value V of the charging voltage and the value of the pulse energy $P_{MO}$ shown in FIG. 22.

Next, at S630c, the laser controller 19 may set the charging voltage in the master oscillator MO to the setting value V calculated at S620. The laser controller 19 may set the charging voltage in all of the power amplifiers from PA(1) to PA(n) to 0.

Next, at S640c, the laser controller 19 may connect a signal line of the trigger signal to the master oscillator MO. The laser controller 19 may disconnect signal lines of the trigger signals from all of the power amplifiers from PA(1) to PA(n).

With the process from S620 to S640c, the laser controller 19 may operate the master oscillator MO alone to allow the excimer laser device 1c to output the pulse laser beam with low pulse energy.

At S610c described above, if the number kop of power amplifiers to be operated for the laser annealing is not 0 (S610c: NO), the laser controller 19 may proceed to S650c.

At S650c, the laser controller 19 may calculate the setting value V of the charging voltage in each of the master oscillator MO and the power amplifiers from PA(1) to PA(kop) such that the output pulse energy matches the target value Pt of the pulse energy. This calculation may be performed, for example, based on the relationship between the setting value V of the charging voltage and the value of the pulse energy $P_{MORA(k)}$ shown in FIG. 22. At kop=1, "from PA(1) to PA(kop)" may mean PA(1) alone.

Next, at S660c, the laser controller 19 may set the value of the charging voltage in the master oscillator MO and the values of the charging voltage in the power amplifiers from PA(1) to PA(kop) to the setting value V. The laser controller 19 may set the values of the charging voltage in the power amplifiers from PA(kop+1) to PA(n) other than those being operated for the laser annealing to 0. At kop=n−1, "from PA(kop+1) to PA(n)" may mean PA(n) alone. At kop=n, "from PA(kop+1) to PA(n)" may mean that there is no power amplifier to be meant.

At S670c, the laser controller 19 may connect the signal lines of the trigger signals to the master oscillator MO and to the power amplifiers from PA(1) to PA(kop). The laser controller 19 may disconnect signal lines of the trigger signals from the power amplifiers from PA(kop+1) to PA(n) other than those being operated for the laser annealing.

With the process from S650c to S670c, the laser controller 19 may operate the master oscillator MO and at least one power amplifier PA to allow the excimer laser device 1c to output the pulse laser beam with high pulse energy.

After S640c or S670c, the laser controller 19 may end the process of this flowchart and return to the process of the main flow described with reference to FIG. 19.

6. Others 6.1 Annealing Apparatus

Figure 26:
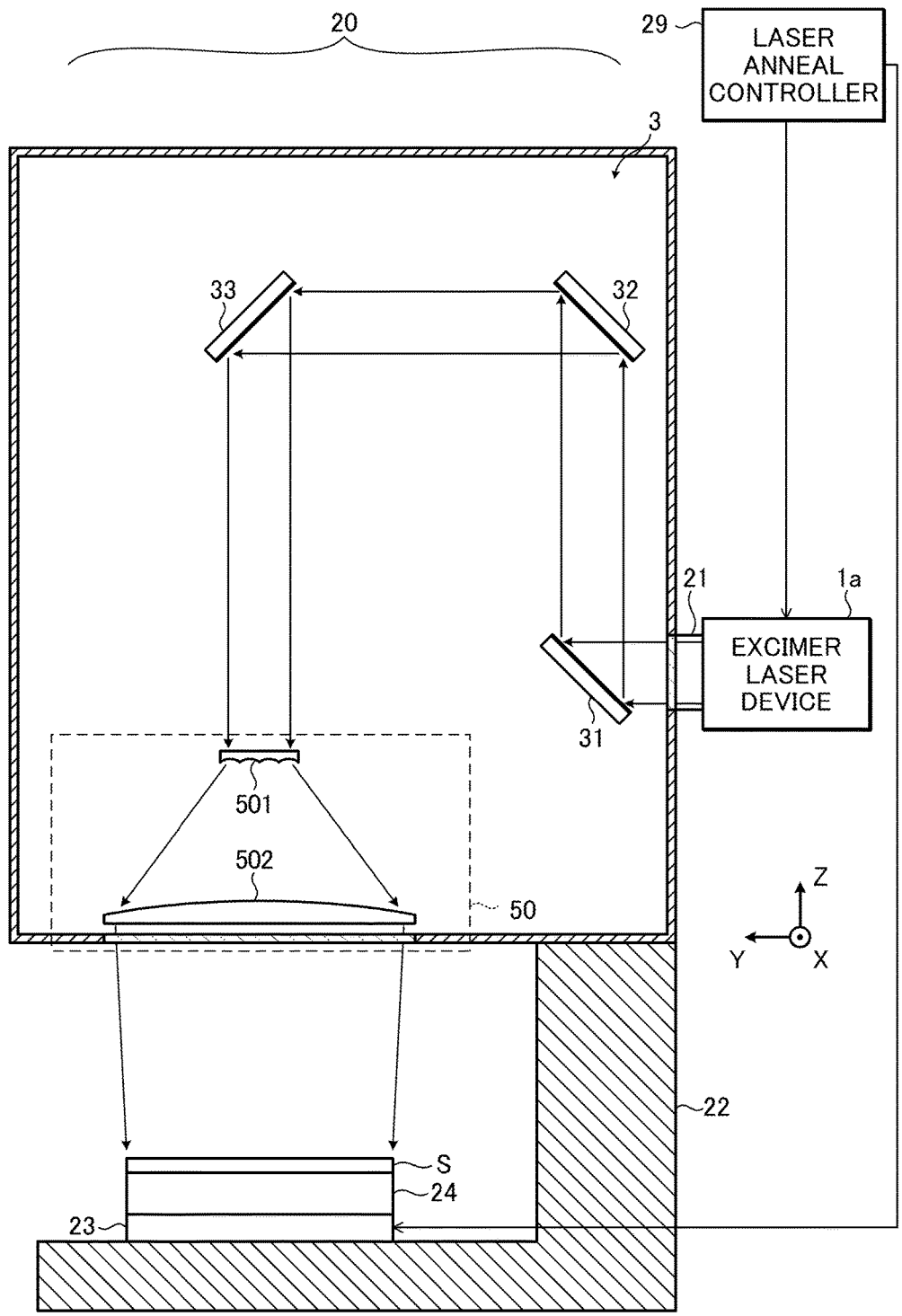
FIG. 26 is a side view of an annealing apparatus used in each of the above-described embodiments.
Figure 27:
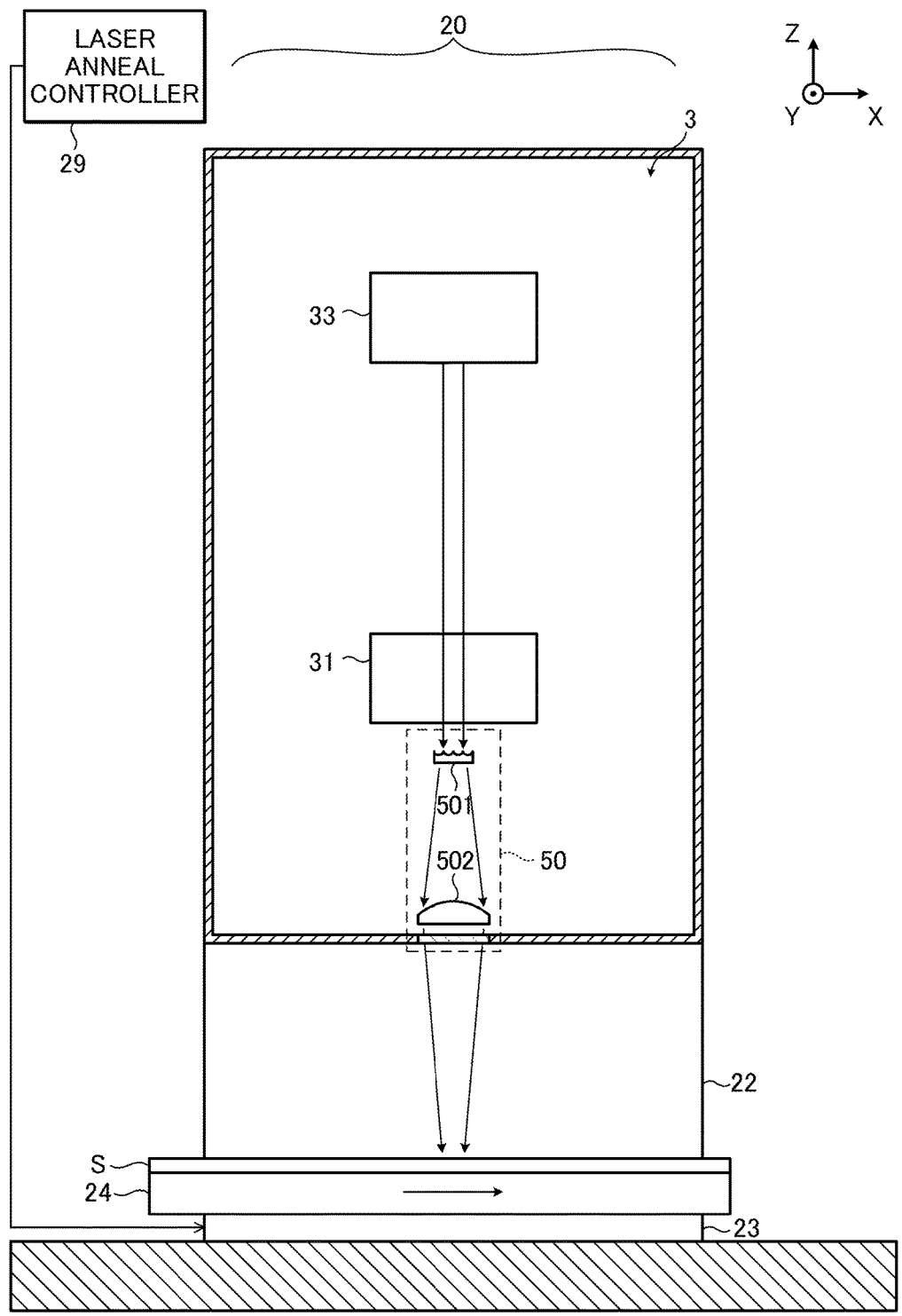
FIG. 27 is a front view of the annealing apparatus shown in FIG. 26.

FIGS. 26 and 27 schematically show a configuration of the annealing apparatus used in each of the above-described embodiments. The annealing apparatus 20 may include a flame 22, an XYZ stage 23, a table 24, and an optical system 3.

The flame 22 may accommodate the optical system 3. Further, the flame 22 may hold the XYZ stage 23 and the table 24. An optical path tube 21 may be connected between the excimer laser device 1a and the flame 22. In place of the excimer laser device 1a (see FIG. 2), the excimer laser device 1b (see FIG. 11) or the excimer laser device 1c (see FIG. 18) may be used.

The travelling direction of the pulse laser beam outputted from the excimer laser device 1a and incident on the optical system 3 may be a Y direction. This pulse laser beam may have a flat-shaped beam cross-section which is longer in a Z direction than in an X direction. In the following description, the X direction and the Y direction may be directions along the irradiated surface of the work piece S irradiated with the pulse laser beam. The Z direction may be a direction opposite to the travelling direction of the pulse laser beam incident on the work piece S. The X direction, the Y direction, and the Z direction may be perpendicular to each other.

Here, the work piece S may be, for example, a glass substrate coated with an amorphous silicon film.

The optical system 3 may include a plurality of high reflective mirrors 31, 32, and 33, and a beam homogenizer 50. The high reflective mirrors 31, 32, and 33 may be configured to introduce the pulse laser beam, which is outputted from the excimer laser device 1a, to the beam homogenizer 50. The beam homogenizer 50 may include a fly-eye lens 501 and condenser optics 502. The beam homogenizer 50 may thus be designed to configure a Koehler illumination to homogenize light intensity distribution of the pulse laser beam. The fly-eye lens 501 may include multiple lenses arranged along the beam cross-section perpendicular to the optical path axis of the pulse laser beam reflected by the high reflective mirrors 31, 32, and 33. Each of the lenses may transmit corresponding part of the pulse laser beam to the condenser optics 502, expanding beam width of the corresponding part.

The condenser optics 502 may be arranged such that the front-side focal plane of the condenser optics 502 substantially coincides with the focal positions of the respective lenses of the fly-eye lens 501, and the rear-side focal plane of the condenser optics 502 substantially coincides with the surface of the work piece S. The condenser optics 502 may thus collimate the respective parts of the pulse laser beam emitted from the lenses included in the fly-eye lens 501. The respective parts of the pulse laser beam may overlap each other at the position of the rear-side focal point of the condenser optics 502 to be incident on the work piece S. Here, each of the lenses included in the fly-eye lens 501 may have a rectangular shape.

According to the configurations described above, the beam homogenizer 50 may reduce unevenness of the light intensity distribution in the beam cross-section of the pulse laser beam incident on the work piece S. The travelling direction of the pulse laser beam outputted from the beam homogenizer 50 and incident on the work piece S may be a −Z direction. A beam cross-section of the pulse laser beam outputted from the beam homogenizer 50 may have a rectangular shape which is longer in the Y direction than in the X direction. The beam width in the Y direction may be longer than the width of the work piece S in the Y direction.

The laser anneal controller 29 may be configured to send control signals to the excimer laser device 1a and the XYZ stage 23. The table 24 may hold the work piece S. The XYZ stage 23 may be capable of moving the table 24 in the X direction, the Y direction, and the Z direction.

Figure 28A:
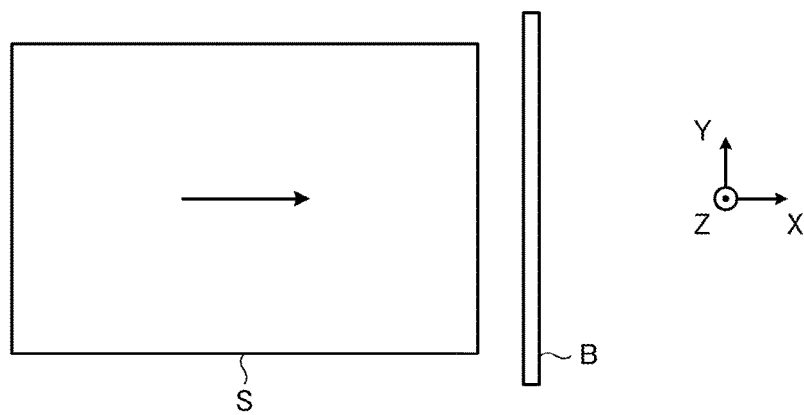
FIG. 28A is a plan view of a work piece S to be irradiated by the annealing apparatus 20 shown in FIGS. 26 and 27.
Figure 28B:
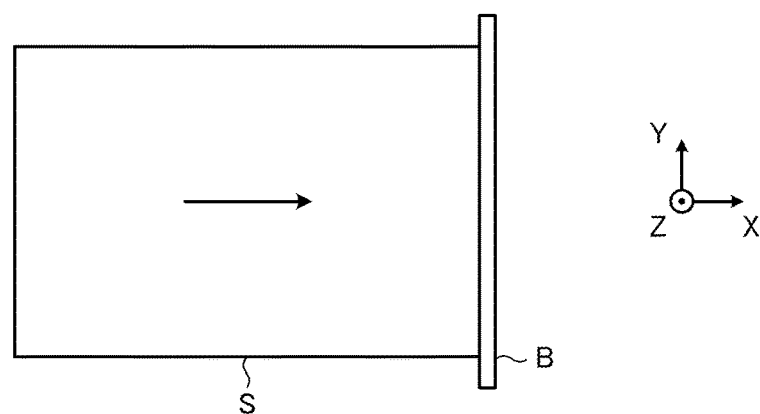
FIG. 28B is a plan view of the work piece S to be irradiated by the annealing apparatus 20 shown in FIGS. 26 and 27.
Figure 28C:
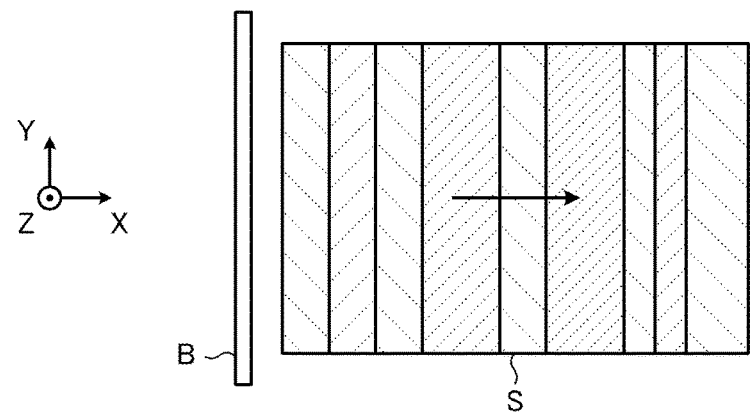
FIG. 28C is a plan view of the work piece S irradiated by the annealing apparatus 20 shown in FIGS. 26 and 27.

FIGS. 28A to 28C are plan views of a work piece S irradiated by the annealing apparatus 20 shown in FIGS. 26 and 27. The laser anneal controller 29 may firstly control the XYZ stage 23 such that the pulse laser beam B outputted from the beam homogenizer 50 is incident on an end of the work piece S in the X direction.

The laser anneal controller 29 may then control the XYZ stage 23 such that the table 24 moves in the X direction at a predetermined speed. An irradiated position with the pulse laser beam B may thus relatively move in the −X direction.

The laser anneal controller 29 may further move the table 24 in the X direction at the predetermined speed, while outputting the trigger signals at the predetermined repetition frequency and changing the target value Pt of the pulse energy. As shown in FIG. 28C, the pulse laser beam applied to the work piece S may thus have a desired distribution of the fluence in the X direction.

According to the above, even if the moving speed of the table 24 is set to a constant value, the pulse laser beam applied to the work piece S may have the desired distribution of the fluence in the X direction. Further, even if the repetition frequency of the trigger signals is set to a constant value, the pulse laser beam applied to the work piece S may have the desired distribution of the fluence in the X direction.

Thus, it may not be necessary to change the moving speed of the table 24 or change the repetition frequency of the pulse laser beam. Throughput of the laser annealing process may thus be improved.

6.2 Configuration of Controller

Figure 29:
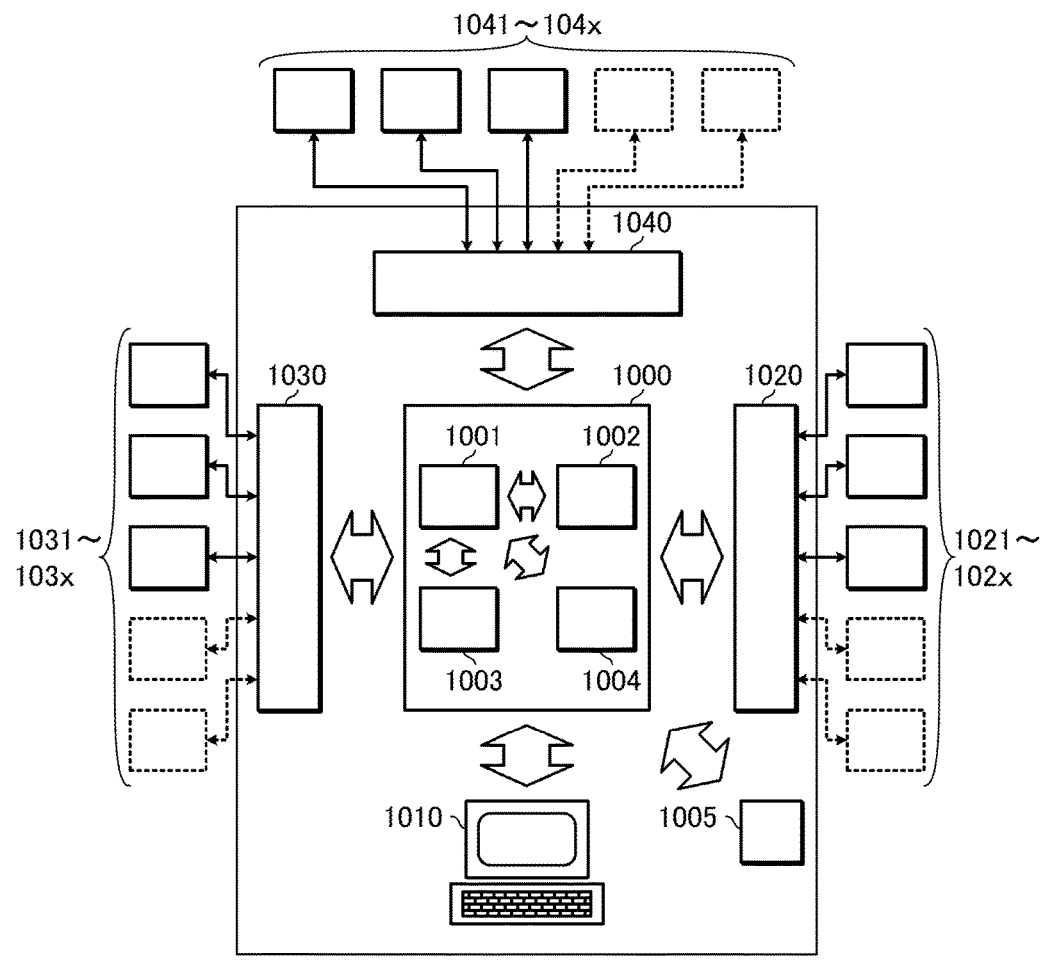
FIG. 29 is a block diagram schematically showing a configuration of the controller.

FIG. 29 is a block diagram schematically showing a configuration of the controller.

Controllers of the above-described embodiments, such as the laser controller 19 and the laser anneal controller 29, may be general-purpose control devices, such as computers or programmable controllers. For example, the controllers may be configured as follows.

Configuration

The controllers may each include a processor 1000, and a storage memory 1005, a user interface 1010, a parallel input/output (I/O) controller 1020, a serial I/O controller 1030, and an analog-to-digital (A/D) and digital-to-analog (D/A) converter 1040 which are connected to the processor 1000. The processor 1000 may include a central processing unit (CPU) 1001, and a memory 1002, a timer 1003, and a graphics processing unit (GPU) 1004 which are connected to the CPU 1001.

Operation

The processor 1000 may read a program stored in the storage memory 1005, execute the read program, read data from the storage memory 1005 in accordance with the program, or store data in the storage memory 1005.

The parallel I/O controller 1020 may be connected to devices 1021 to 102x with which it may communicate through parallel I/O ports. The parallel I/O controller 1020 may control digital-signal communication through the parallel I/O ports while the processor 1000 executes the program.

The serial I/O controller 1030 may be connected to devices 1031 to 103x with which it may communicate through serial I/O ports. The serial I/O controller 1030 may control digital-signal communication through the serial I/O ports while the processor 1000 executes the program.

The A/D and D/A converter 1040 may be connected to devices 1041 to 104x with which it may communicate through analog ports. The A/D and D/A converter 1040 may control analog-signal communication through the analog ports while the processor 1000 executes the program.

The user interface 1010 may be configured to display the progress of the program being executed by the processor 1000 in accordance with instructions from an operator, or to cause the processor 1000 to stop the execution of the program or perform an interrupt in accordance with instructions from the operator.

The CPU 1001 of the processor 1000 may perform arithmetic processing of the program. The memory 1002 may temporarily store the program being executed by the CPU 1001 or temporarily store data in the arithmetic processing. The timer 1003 may measure time or elapsed time and output it to the CPU 1001 in accordance with the program being executed. When image data is inputted to the processor 1000, the GPU 1004 may process the image data in accordance with the program being executed and output the results to the CPU 1001.

The devices 1021 to 102x, which are connected through the parallel I/O ports to the parallel I/O controller 1020, may be used when the excimer laser device 1a, the laser annealing apparatus 2a, another controller, or the like receives or sends the trigger signal or other timing signal.

The devices 1031 to 103x, which are connected through the serial I/O ports to the serial I/O controller 1030, may be used when the excimer laser device 1a, the laser annealing apparatus 2a, another controller, or the like sends or receives data.

The devices 1041 to 104x, which are connected through the analog ports to the A/D and D/A converter 1040, may serve as various sensors, such as the pulse energy measuring unit 17 or the like.

The controllers thus configured may be capable of realizing the operations described in the embodiments.

The above descriptions are intended to be only illustrative rather than being limiting. Accordingly, it will be clear to those skilled in the art that various changes may be made to the embodiments of the present disclosure without departing from the scope of the appended claims.

The terms used in the present specification and the appended claims are to be interpreted as not being limiting. For example, the term "include" or "included" should be interpreted as not being limited to items described as being included. Further, the term "have" should be interpreted as not being limited to items described as being had. Furthermore, the modifier "a" or "an" as used in the present specification and the appended claims should be interpreted as meaning "at least one" or "one or more".

The invention claimed is:

1. An excimer laser device configured to receive data on a target value of pulse energy from an external device and output a pulse laser beam, comprising:
   a master oscillator;
   at least one power amplifier including a chamber provided in an optical path of the pulse laser beam outputted from the master oscillator, a pair of electrodes provided in the chamber, and an electric power source configured to apply voltage to the pair of electrodes; and
   a controller configured to control the electric power source of one power amplifier of the at least one power amplifier to stop applying the voltage to the pair of electrodes based on the target value of the pulse energy.

2. The excimer laser device according to claim 1, wherein the controller controls the electric power source to stop applying the voltage to the pair of electrodes when the target value of the pulse energy is lower than a predetermined value.

3. The excimer laser device according to claim 2, wherein the predetermined value is a value between
   a maximum value of the pulse energy of the pulse laser beam outputted from the excimer laser device when applying the voltage by the electric power source to the pair of electrodes is stopped, and
   a minimum value of the pulse energy of the pulse laser beam outputted from the excimer laser device when the voltage is applied by the electric power source to the pair of electrodes.

4. The excimer laser device according to claim 1, wherein the controller controls the electric power source to stop applying the voltage to the pair of electrodes by stopping output of a trigger signal triggering the voltage applied by the electric power source to the pair of electrodes.

5. The excimer laser device according to claim 1, wherein the controller controls the electric power source to stop applying the voltage to the pair of electrodes by setting a charging voltage of a charger of the electric power source to a value where an electric discharge does not occur between the pair of electrodes.

6. The excimer laser device according to claim 1, further comprising:

a storage medium storing a data table readable by the controller, the data table describing a relationship between a setting value of a charging voltage of a charger of the electric power source and a value of the pulse energy of the pulse laser beam outputted from the excimer laser device.

7. The excimer laser device according to claim 6, wherein the controller is configured to execute a first process to measure data on the relationship between the setting value of the charging voltage and the value of the pulse energy of the pulse laser beam outputted from the excimer laser device, while controlling the master oscillator to perform laser oscillation and changing the setting value of the charging voltage of the charger of the electric power source, and a second process to update the data table using the data obtained by the first process.

8. The excimer laser device according to claim. 1, wherein the at least one power amplifier includes a first power amplifier and a second power amplifier, the second power amplifier being provided in the optical path of the pulse laser beam outputted from the first power amplifier.

9. The excimer laser device according to claim 8, wherein the first power amplifier includes a first pair of electrodes and a first electric power source, the second power amplifier includes a second pair of electrodes and a second electric power source, and the controller controls the first electric power source of the first power amplifier to stop applying the voltage to the first pair of electrodes, and controls the second electric power source of the second power amplifier to apply the voltage to the second pair of electrodes.

10. The excimer laser device according to claim 9, wherein the at least one power amplifier further includes a third power amplifier provided in the optical path of the pulse laser beam outputted from the second power amplifier, the third power amplifier including a third pair of electrodes and a third electric power source, and the controller controls the first and second electric power sources of the first and second power amplifiers to stop applying the voltage to the first and second pairs of electrodes, respectively, and controls the third electric power source of the third power amplifier to apply the voltage to the third pair of electrodes.

11. An excimer laser device configured to receive data on a target value of pulse energy from an external device and output a pulse laser beam, comprising:

a master oscillator;

at least one power amplifier including a chamber provided in an optical path of the pulse laser beam outputted from the master oscillator, a pair of electrodes provided in the chamber, and an electric power source configured to apply voltage to the pair of electrodes; and a controller configured to control the electric power source of one power amplifier of the at least one power amplifier to stop applying the voltage to the pair of electrodes, at a time when the pulse laser beam passes between the pair of electrodes, based on the target value of the pulse energy.

12. The excimer laser device according to claim 11, wherein the controller controls the electric power source to apply the voltage to the pair of electrodes such that an electric discharge occurs between the pair of electrodes, at a time other than a time when the pulse laser beam passes between the pair of electrodes.

* * * * *